US008739295B2

(12) United States Patent
Moskowitz et al.

(10) Patent No.: US 8,739,295 B2
(45) Date of Patent: *May 27, 2014

(54) SECURE PERSONAL CONTENT SERVER

(75) Inventors: Scott A. Moskowitz, Sunny Isles Beach, FL (US); Mike W. Berry, Seattle, WA (US)

(73) Assignee: Blue Spike, Inc., Sunny Isles Beach, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/413,691

(22) Filed: Mar. 7, 2012

(65) Prior Publication Data

US 2012/0209955 A1   Aug. 16, 2012

Related U.S. Application Data

(63) Continuation of application No. 12/287,443, filed on Oct. 9, 2008, now Pat. No. 8,171,561, which is a continuation of application No. 10/049,101, filed as application No. PCT/US00/21189 on Aug. 4, 2000, now Pat. No. 7,475,246.

(60) Provisional application No. 60/147,134, filed on Aug. 4, 1999, provisional application No. 60/213,489, filed on Jun. 23, 2000.

(51) Int. Cl.
*H04L 29/06* (2006.01)

(52) U.S. Cl.
USPC ............ 726/26; 380/236; 380/237; 380/238; 713/169; 455/3.06

(58) Field of Classification Search
None
See application file for complete search history.

(56) References Cited

U.S. PATENT DOCUMENTS

| 3,947,825 A | 3/1976 | Cassada |
| 3,984,624 A | 10/1976 | Waggener |

(Continued)

FOREIGN PATENT DOCUMENTS

| EP | 0372601 | 6/1990 |
| EP | 0565947 | 10/1993 |

(Continued)

OTHER PUBLICATIONS

Ching, Neil; Jones, Vicki; Winslett, Marianne. Authorization in the Digital Library: Secure Access to Service across Enterprise Boundaries. Proceedings of the Third Forum on Research and Technology Advances in Digital Libraries, 1996. Pub. Date: 1996. Relevant pp. 110-119. http://ieeexplore.ieee.org/stamp/stamp.jsp?tp=&arnumber=502521.*

(Continued)

*Primary Examiner* — Cordelia Zecher
*Assistant Examiner* — Jeremiah Avery
(74) *Attorney, Agent, or Firm* — Neifeld IP Law, PC

(57) ABSTRACT

A local content server system (LCS) for creating a secure environment for digital content is disclosed, which system comprises: a communications port in communication for connecting the LCS via a network to at least one Secure Electronic Content Distributor (SECD), which SECD is capable of storing a plurality of data sets, is capable of receiving a request to transfer at least one content data set, and is capable of transmitting the at least one content data set in a secured transmission; a rewritable storage medium whereby content received from outside the LCS may be stored and retrieved; a domain processor that imposes rules and procedures for content being transferred between the LCS and devices outside the LCS; and a programmable address module which can be programmed with an identification code uniquely associated with the LCS. The LCS is provided with rules and procedures for accepting and transmitting content data.

23 Claims, 10 Drawing Sheets

(56) References Cited

U.S. PATENT DOCUMENTS

| | | |
|---|---|---|
| 3,986,624 A | 10/1976 | Cates, Jr. et al. |
| 4,038,596 A | 7/1977 | Lee |
| 4,200,770 A | 4/1980 | Hellman et al. |
| 4,218,582 A | 8/1980 | Hellman et al. |
| 4,339,134 A | 7/1982 | Macheel |
| 4,390,898 A | 6/1983 | Bond et al. |
| 4,405,829 A | 9/1983 | Rivest et al. |
| 4,424,414 A | 1/1984 | Hellman et al. |
| 4,528,588 A | 7/1985 | Lofberg |
| 4,672,605 A | 6/1987 | Hustig et al. |
| 4,748,668 A | 5/1988 | Shamir et al. |
| 4,789,928 A | 12/1988 | Fujisaki |
| 4,827,508 A | 5/1989 | Shear |
| 4,876,617 A | 10/1989 | Best et al. |
| 4,896,275 A | 1/1990 | Jackson |
| 4,908,873 A | 3/1990 | Philibert et al. |
| 4,939,515 A | 7/1990 | Adelson |
| 4,969,204 A | 11/1990 | Melnychuk et al. |
| 4,972,471 A | 11/1990 | Gross et al. |
| 4,977,594 A | 12/1990 | Shear |
| 4,979,210 A | 12/1990 | Nagata et al. |
| 4,980,782 A | 12/1990 | Ginkel |
| 5,050,213 A | 9/1991 | Shear |
| 5,073,925 A | 12/1991 | Nagata et al. |
| 5,077,665 A | 12/1991 | Silverman et al. |
| 5,111,530 A | 5/1992 | Kutaragi |
| 5,113,437 A | 5/1992 | Best et al. |
| 5,136,581 A | 8/1992 | Muehrcke |
| 5,136,646 A | 8/1992 | Haber et al. |
| 5,136,647 A | 8/1992 | Haber et al. |
| 5,142,576 A | 8/1992 | Nadan |
| 5,161,210 A | 11/1992 | Druyvesteyn et al. |
| 5,210,820 A | 5/1993 | Kenyon |
| 5,243,423 A | 9/1993 | DeJean et al. |
| 5,243,515 A | 9/1993 | Lee |
| 5,287,407 A | 2/1994 | Holmes |
| 5,319,735 A | 6/1994 | Preuss et al. |
| 5,327,520 A | 7/1994 | Chen |
| 5,341,429 A * | 8/1994 | Stringer et al. ............... 705/52 |
| 5,341,477 A | 8/1994 | Pitkin et al. |
| 5,363,448 A | 11/1994 | Koopman et al. |
| 5,365,586 A | 11/1994 | Indeck et al. |
| 5,369,707 A | 11/1994 | Follendore, III |
| 5,379,345 A | 1/1995 | Greenberg |
| 5,394,324 A | 2/1995 | Clearwater |
| 5,398,285 A | 3/1995 | Borgelt et al. |
| 5,406,627 A | 4/1995 | Thompson et al. |
| 5,408,505 A | 4/1995 | Indeck et al. |
| 5,410,598 A | 4/1995 | Shear |
| 5,412,718 A | 5/1995 | Narasimhalv et al. |
| 5,418,713 A | 5/1995 | Allen |
| 5,428,606 A | 6/1995 | Moskowitz |
| 5,450,490 A | 9/1995 | Jensen et al. |
| 5,469,536 A | 11/1995 | Blank |
| 5,471,533 A | 11/1995 | Wang et al. |
| 5,478,990 A | 12/1995 | Montanari et al. |
| 5,479,210 A | 12/1995 | Cawley et al. |
| 5,487,168 A | 1/1996 | Geiner et al. |
| 5,493,677 A | 2/1996 | Balogh et al. |
| 5,497,419 A | 3/1996 | Hill |
| 5,506,795 A | 4/1996 | Yamakawa |
| 5,513,126 A | 4/1996 | Harkins et al. |
| 5,513,261 A | 4/1996 | Maher |
| 5,530,739 A | 6/1996 | Okada |
| 5,530,751 A | 6/1996 | Morris |
| 5,530,759 A | 6/1996 | Braudaway et al. |
| 5,539,735 A | 7/1996 | Moskowitz |
| 5,548,579 A | 8/1996 | Lebrun et al. |
| 5,568,570 A | 10/1996 | Rabbani |
| 5,579,124 A | 11/1996 | Aijala et al. |
| 5,581,703 A | 12/1996 | Baugher et al. |
| 5,583,488 A | 12/1996 | Sala et al. |
| 5,598,470 A | 1/1997 | Cooper et al. |
| 5,606,609 A | 2/1997 | Houser et al. |
| 5,613,004 A | 3/1997 | Cooperman et al. |
| 5,617,119 A | 4/1997 | Briggs et al. |
| 5,617,506 A | 4/1997 | Burk |
| 5,625,690 A | 4/1997 | Michel et al. |
| 5,629,980 A | 5/1997 | Stefik et al. |
| 5,633,932 A | 5/1997 | Davis et al. |
| 5,634,040 A | 5/1997 | Her et al. |
| 5,636,276 A | 6/1997 | Brugger |
| 5,636,292 A | 6/1997 | Rhoads |
| 5,640,569 A | 6/1997 | Miller et al. |
| 5,646,997 A | 7/1997 | Barton |
| 5,657,461 A | 8/1997 | Harkins et al. |
| 5,659,726 A | 8/1997 | Sandford, II et al. |
| 5,664,018 A | 9/1997 | Leighton |
| 5,673,316 A | 9/1997 | Auerbach et al. |
| 5,675,653 A | 10/1997 | Nelson |
| 5,677,952 A | 10/1997 | Blakley et al. |
| 5,680,462 A | 10/1997 | Miller et al. |
| 5,687,236 A | 11/1997 | Moskowitz et al. |
| 5,689,587 A | 11/1997 | Bender et al. |
| 5,696,828 A | 12/1997 | Koopman, Jr. |
| 5,719,937 A | 2/1998 | Warren et al. |
| 5,721,788 A | 2/1998 | Powell et al. |
| 5,734,752 A | 3/1998 | Knox |
| 5,737,416 A | 4/1998 | Cooper et al. |
| 5,737,733 A | 4/1998 | Eller |
| 5,740,244 A | 4/1998 | Indeck et al. |
| 5,745,569 A | 4/1998 | Moskowitz et al. |
| 5,748,783 A | 5/1998 | Rhoads |
| 5,751,811 A | 5/1998 | Magnotti et al. |
| 5,754,697 A | 5/1998 | Fu et al. |
| 5,754,938 A * | 5/1998 | Herz et al. ............... 725/116 |
| 5,757,923 A | 5/1998 | Koopman, Jr. |
| 5,765,152 A | 6/1998 | Erickson |
| 5,768,396 A | 6/1998 | Sone |
| 5,774,452 A | 6/1998 | Wolosewicz |
| 5,781,184 A | 7/1998 | Wasserman |
| 5,790,677 A | 8/1998 | Fox et al. |
| 5,799,083 A | 8/1998 | Brothers et al. |
| 5,809,139 A | 9/1998 | Grirod et al. |
| 5,809,160 A | 9/1998 | Powell et al. |
| 5,818,818 A * | 10/1998 | Soumiya et al. ............... 370/252 |
| 5,822,432 A | 10/1998 | Moskowitz et al. |
| 5,828,325 A | 10/1998 | Wolosewicz et al. |
| 5,832,119 A | 11/1998 | Rhoads |
| 5,839,100 A | 11/1998 | Wegener |
| 5,842,213 A * | 11/1998 | Odom et al. ............... 707/999.1 |
| 5,848,155 A | 12/1998 | Cox |
| 5,850,481 A | 12/1998 | Rhoads |
| 5,859,920 A | 1/1999 | Daly et al. |
| 5,860,099 A | 1/1999 | Milios et al. |
| 5,862,260 A * | 1/1999 | Rhoads ............... 382/232 |
| 5,870,474 A | 2/1999 | Wasilewski et al. |
| 5,884,033 A | 3/1999 | Duvall et al. |
| 5,889,868 A | 3/1999 | Moskowitz et al. |
| 5,893,067 A | 4/1999 | Bender et al. |
| 5,894,521 A | 4/1999 | Conley |
| 5,903,721 A | 5/1999 | Sixtus |
| 5,905,800 A | 5/1999 | Moskowitz et al. |
| 5,905,975 A | 5/1999 | Ausubel |
| 5,912,972 A | 6/1999 | Barton |
| 5,915,027 A | 6/1999 | Cox et al. |
| 5,917,915 A | 6/1999 | Hirose |
| 5,918,223 A | 6/1999 | Blum |
| 5,920,900 A | 7/1999 | Poole et al. |
| 5,923,763 A | 7/1999 | Walker et al. |
| 5,930,369 A | 7/1999 | Cox et al. |
| 5,930,377 A | 7/1999 | Powell et al. |
| 5,940,134 A | 8/1999 | Wirtz |
| 5,943,422 A | 8/1999 | Van Wie et al. |
| 5,949,055 A | 9/1999 | Fleet |
| 5,963,909 A | 10/1999 | Warren et al. |
| 5,973,731 A | 10/1999 | Schwab |
| 5,974,141 A | 10/1999 | Saito |
| 5,991,426 A | 11/1999 | Cox et al. |
| 5,999,217 A | 12/1999 | Berners-Lee |
| 6,009,176 A | 12/1999 | Gennaro et al. |
| 6,029,126 A | 2/2000 | Malvar |
| 6,029,195 A * | 2/2000 | Herz ............... 725/116 |
| 6,041,316 A | 3/2000 | Allen |

(56) References Cited

U.S. PATENT DOCUMENTS

| | | | |
|---|---|---|---|
| 6,044,471 A | 3/2000 | Colvin | |
| 6,049,838 A | 4/2000 | Miller et al. | |
| 6,051,029 A | 4/2000 | Paterson et al. | |
| 6,061,793 A | 5/2000 | Tewfik et al. | |
| 6,067,622 A | 5/2000 | Moore | |
| 6,069,914 A | 5/2000 | Cox | |
| 6,078,664 A | 6/2000 | Moskowitz et al. | |
| 6,081,251 A | 6/2000 | Sakai et al. | |
| 6,081,587 A | 6/2000 | Reyes et al. | |
| 6,081,597 A | 6/2000 | Hoffstein | |
| 6,088,455 A | 7/2000 | Logan et al. | |
| 6,131,162 A | 10/2000 | Yoshiura et al. | |
| 6,141,753 A | 10/2000 | Zhao et al. | |
| 6,141,754 A | 10/2000 | Choy | |
| 6,148,333 A * | 11/2000 | Guedalia et al. | 709/219 |
| 6,154,571 A | 11/2000 | Cox et al. | |
| 6,173,322 B1 * | 1/2001 | Hu | 709/224 |
| 6,178,405 B1 | 1/2001 | Ouyang | |
| 6,192,138 B1 | 2/2001 | Yamadaji | |
| 6,199,058 B1 | 3/2001 | Wong et al. | |
| 6,205,249 B1 | 3/2001 | Moskowitz | |
| 6,208,745 B1 | 3/2001 | Florencio et al. | |
| 6,226,618 B1 * | 5/2001 | Downs et al. | 705/51 |
| 6,230,268 B1 | 5/2001 | Miwa et al. | |
| 6,233,347 B1 | 5/2001 | Chen et al. | |
| 6,233,684 B1 | 5/2001 | Stefik et al. | |
| 6,240,121 B1 | 5/2001 | Senoh | |
| 6,263,313 B1 | 7/2001 | Milstead et al. | |
| 6,272,634 B1 | 8/2001 | Tewfik et al. | |
| 6,275,988 B1 | 8/2001 | Nagashima et al. | |
| 6,278,780 B1 | 8/2001 | Shimada | |
| 6,278,791 B1 | 8/2001 | Honsinger et al. | |
| 6,282,300 B1 | 8/2001 | Bloom et al. | |
| 6,282,650 B1 | 8/2001 | Davis | |
| 6,285,775 B1 | 9/2001 | Wu et al. | |
| 6,301,663 B1 | 10/2001 | Kato et al. | |
| 6,310,962 B1 | 10/2001 | Chung et al. | |
| 6,330,335 B1 | 12/2001 | Rhoads | |
| 6,330,672 B1 | 12/2001 | Shur | |
| 6,345,100 B1 | 2/2002 | Levine | |
| 6,351,765 B1 | 2/2002 | Pietropaolo et al. | |
| 6,363,483 B1 | 3/2002 | Keshav | |
| 6,373,892 B1 | 4/2002 | Ichien et al. | |
| 6,373,960 B1 | 4/2002 | Conover et al. | |
| 6,374,036 B1 | 4/2002 | Ryan et al. | |
| 6,377,625 B1 | 4/2002 | Kim | |
| 6,381,618 B1 | 4/2002 | Jones et al. | |
| 6,381,747 B1 | 4/2002 | Wonfor et al. | |
| 6,385,324 B1 | 5/2002 | Koppen | |
| 6,385,329 B1 | 5/2002 | Sharma et al. | |
| 6,385,596 B1 * | 5/2002 | Wiser et al. | 705/51 |
| 6,389,538 B1 * | 5/2002 | Gruse et al. | 713/194 |
| 6,398,245 B1 * | 6/2002 | Gruse et al. | 280/228 |
| 6,405,203 B1 | 6/2002 | Collart | |
| 6,415,041 B1 | 7/2002 | Oami et al. | |
| 6,418,421 B1 * | 7/2002 | Hurtado et al. | 705/54 |
| 6,425,081 B1 | 7/2002 | Iwamura | |
| 6,430,301 B1 | 8/2002 | Petrovic | |
| 6,430,302 B2 | 8/2002 | Rhoads | |
| 6,442,283 B1 | 8/2002 | Tewfik et al. | |
| 6,446,211 B1 | 9/2002 | Colvin | |
| 6,453,252 B1 | 9/2002 | Laroche | |
| 6,457,058 B1 | 9/2002 | Ullum et al. | |
| 6,463,468 B1 | 10/2002 | Buch et al. | |
| 6,480,937 B1 | 11/2002 | Vorbach | |
| 6,480,963 B1 * | 11/2002 | Tachibana et al. | 726/4 |
| 6,484,264 B1 | 11/2002 | Colvin | |
| 6,493,457 B1 | 12/2002 | Quackenbush | |
| 6,502,195 B1 | 12/2002 | Colvin | |
| 6,510,513 B1 * | 1/2003 | Danieli | 713/156 |
| 6,522,767 B1 | 2/2003 | Moskowitz et al. | |
| 6,522,769 B1 | 2/2003 | Rhoads et al. | |
| 6,523,113 B1 | 2/2003 | Wehrenberg | |
| 6,530,021 B1 | 3/2003 | Epstein et al. | |
| 6,532,284 B2 | 3/2003 | Walker et al. | |
| 6,539,475 B1 | 3/2003 | Cox et al. | |
| 6,557,103 B1 | 4/2003 | Boncelet, Jr. et al. | |
| 6,584,125 B1 | 6/2003 | Katto | |
| 6,587,837 B1 * | 7/2003 | Spagna et al. | 705/52 |
| 6,590,996 B1 | 7/2003 | Reed | |
| 6,598,162 B1 | 7/2003 | Moskowitz | |
| 6,606,393 B1 | 8/2003 | Xie et al. | |
| 6,611,599 B2 | 8/2003 | Natarajan | |
| 6,647,424 B1 | 11/2003 | Pearson et al. | |
| 6,658,010 B1 | 12/2003 | Enns et al. | |
| 6,665,489 B2 | 12/2003 | Collart | |
| 6,668,246 B1 | 12/2003 | Yeung et al. | |
| 6,668,325 B1 | 12/2003 | Collberg et al. | |
| 6,674,858 B1 | 1/2004 | Kimura | |
| 6,687,683 B1 | 2/2004 | Harada et al. | |
| 6,725,372 B1 | 4/2004 | Lewis et al. | |
| 6,754,822 B1 | 6/2004 | Zhao | |
| 6,775,772 B1 | 8/2004 | Binding et al. | |
| 6,784,354 B1 | 8/2004 | Lu et al. | |
| 6,785,815 B1 | 8/2004 | Serret-Avila et al. | |
| 6,785,825 B2 | 8/2004 | Colvin | |
| 6,792,548 B2 | 9/2004 | Colvin | |
| 6,792,549 B2 | 9/2004 | Colvin | |
| 6,795,925 B2 | 9/2004 | Colvin | |
| 6,799,277 B2 | 9/2004 | Colvin | |
| 6,804,453 B1 | 10/2004 | Sasamoto | |
| 6,813,717 B2 | 11/2004 | Colvin | |
| 6,813,718 B2 | 11/2004 | Colvin | |
| 6,823,455 B1 | 11/2004 | Macy et al. | |
| 6,834,308 B1 | 12/2004 | Ikezoye et al. | |
| 6,842,862 B2 | 1/2005 | Chow et al. | |
| 6,853,726 B1 | 2/2005 | Moskowitz et al. | |
| 6,857,078 B2 | 2/2005 | Colvin | |
| 6,865,747 B1 | 3/2005 | Mercier | |
| 6,931,534 B1 | 8/2005 | Jandel et al. | |
| 6,950,941 B1 * | 9/2005 | Lee et al. | 713/193 |
| 6,957,330 B1 * | 10/2005 | Hughes | 713/163 |
| 6,966,002 B1 | 11/2005 | Torrubia-Saez | |
| 6,968,337 B2 | 11/2005 | Wold | |
| 6,977,894 B1 | 12/2005 | Achilles et al. | |
| 6,978,370 B1 | 12/2005 | Kocher | |
| 6,983,058 B1 | 1/2006 | Fukuoka | |
| 6,986,063 B2 | 1/2006 | Colvin | |
| 6,990,453 B2 | 1/2006 | Wang | |
| 7,007,166 B1 | 2/2006 | Moskowitz et al. | |
| 7,020,285 B1 | 3/2006 | Kirovski et al. | |
| 7,035,049 B2 | 4/2006 | Yamamoto | |
| 7,035,409 B1 | 4/2006 | Moskowitz | |
| 7,043,050 B2 | 5/2006 | Yuval | |
| 7,046,808 B1 | 5/2006 | Metois et al. | |
| 7,050,396 B1 | 5/2006 | Cohen et al. | |
| 7,051,208 B2 | 5/2006 | Venkatesan et al. | |
| 7,058,570 B1 | 6/2006 | Yu et al. | |
| 7,093,295 B1 | 8/2006 | Saito | |
| 7,095,715 B2 | 8/2006 | Buckman | |
| 7,095,874 B2 | 8/2006 | Moskowitz et al. | |
| 7,103,184 B2 | 9/2006 | Jian | |
| 7,107,451 B2 | 9/2006 | Moskowitz | |
| 7,123,718 B1 | 10/2006 | Moskowitz et al. | |
| 7,127,615 B2 | 10/2006 | Moskowitz | |
| 7,150,003 B2 | 12/2006 | Naumovich et al. | |
| 7,152,162 B2 | 12/2006 | Moskowitz et al. | |
| 7,159,116 B2 | 1/2007 | Moskowitz | |
| 7,162,642 B2 | 1/2007 | Schumann et al. | |
| 7,177,429 B2 | 2/2007 | Moskowitz et al. | |
| 7,177,430 B2 | 2/2007 | Kim | |
| 7,206,649 B2 | 4/2007 | Kirovski et al. | |
| 7,231,524 B2 | 6/2007 | Burns | |
| 7,233,669 B2 | 6/2007 | Candelore | |
| 7,240,210 B2 | 7/2007 | Michak et al. | |
| 7,266,697 B2 | 9/2007 | Kirovski et al. | |
| 7,286,451 B2 | 10/2007 | Wirtz | |
| 7,287,275 B2 | 10/2007 | Moskowitz | |
| 7,289,643 B2 | 10/2007 | Brunk et al. | |
| 7,343,492 B2 | 3/2008 | Moskowitz et al. | |
| 7,346,472 B1 | 3/2008 | Moskowitz et al. | |
| 7,362,775 B1 | 4/2008 | Moskowitz | |
| 7,363,278 B2 | 4/2008 | Schmelzer et al. | |
| 7,409,073 B2 | 8/2008 | Moskowitz et al. | |

(56) References Cited

U.S. PATENT DOCUMENTS

| | | |
|---|---|---|
| 7,457,962 B2 | 11/2008 | Moskowitz |
| 7,460,994 B2 | 12/2008 | Herre et al. |
| 7,475,246 B1 | 1/2009 | Moskowitz |
| 7,530,102 B2 | 5/2009 | Moskowitz |
| 7,532,725 B2 | 5/2009 | Moskowitz et al. |
| 7,568,100 B1 | 7/2009 | Moskowitz et al. |
| 7,647,502 B2 | 1/2010 | Moskowitz |
| 7,647,503 B2 | 1/2010 | Moskowitz |
| 7,664,263 B2 | 2/2010 | Moskowitz |
| 7,743,001 B1 | 6/2010 | Vermeulen |
| 7,761,712 B2 | 7/2010 | Moskowitz |
| 7,779,261 B2 | 8/2010 | Moskowitz |
| 8,095,949 B1 * | 1/2012 | Hendricks et al. .............. 725/29 |
| 2001/0010078 A1 | 7/2001 | Moskowitz |
| 2001/0029580 A1 | 10/2001 | Moskowitz |
| 2001/0043594 A1 | 11/2001 | Ogawa et al. |
| 2002/0009208 A1 | 1/2002 | Alattar |
| 2002/0010684 A1 | 1/2002 | Moskowitz |
| 2002/0026343 A1 | 2/2002 | Duenke |
| 2002/0056041 A1 | 5/2002 | Moskowitz |
| 2002/0057651 A1 | 5/2002 | Roberts |
| 2002/0071556 A1 | 6/2002 | Moskowitz et al. |
| 2002/0073043 A1 | 6/2002 | Herman et al. |
| 2002/0097873 A1 | 7/2002 | Petrovic |
| 2002/0103883 A1 | 8/2002 | Haverstock et al. |
| 2002/0152179 A1 | 10/2002 | Racov |
| 2002/0161741 A1 | 10/2002 | Wang et al. |
| 2003/0002862 A1 | 1/2003 | Rodriguez |
| 2003/0027549 A1 | 2/2003 | Kiel |
| 2003/0101342 A1 | 5/2003 | Hansen |
| 2003/0126445 A1 | 7/2003 | Wehrenberg |
| 2003/0133702 A1 | 7/2003 | Collart |
| 2003/0200439 A1 | 10/2003 | Moskowitz |
| 2003/0219143 A1 | 11/2003 | Moskowitz et al. |
| 2004/0028222 A1 | 2/2004 | Sewell et al. |
| 2004/0037449 A1 | 2/2004 | Davis et al. |
| 2004/0049695 A1 | 3/2004 | Choi et al. |
| 2004/0059918 A1 | 3/2004 | Xu |
| 2004/0083369 A1 | 4/2004 | Erlingsson et al. |
| 2004/0086119 A1 | 5/2004 | Moskowitz |
| 2004/0093521 A1 | 5/2004 | Hamadeh et al. |
| 2004/0117628 A1 | 6/2004 | Colvin |
| 2004/0117664 A1 | 6/2004 | Colvin |
| 2004/0125983 A1 | 7/2004 | Reed et al. |
| 2004/0128514 A1 | 7/2004 | Rhoads |
| 2004/0225894 A1 | 11/2004 | Colvin |
| 2004/0243540 A1 | 12/2004 | Moskowitz et al. |
| 2005/0135615 A1 | 6/2005 | Moskowitz et al. |
| 2005/0160271 A9 | 7/2005 | Brundage et al. |
| 2005/0177727 A1 | 8/2005 | Moskowitz et al. |
| 2005/0246554 A1 | 11/2005 | Batson |
| 2006/0005029 A1 | 1/2006 | Petrovic et al. |
| 2006/0013395 A1 | 1/2006 | Brundage et al. |
| 2006/0013451 A1 | 1/2006 | Haitsma |
| 2006/0041753 A1 | 2/2006 | Haitsma |
| 2006/0101269 A1 | 5/2006 | Moskowitz et al. |
| 2006/0140403 A1 | 6/2006 | Moskowitz |
| 2006/0251291 A1 | 11/2006 | Rhoads |
| 2006/0285722 A1 | 12/2006 | Moskowitz et al. |
| 2007/0011458 A1 | 1/2007 | Moskowitz |
| 2007/0028113 A1 | 2/2007 | Moskowitz |
| 2007/0064940 A1 | 3/2007 | Moskowitz et al. |
| 2007/0079131 A1 | 4/2007 | Moskowitz et al. |
| 2007/0083467 A1 | 4/2007 | Lindahl et al. |
| 2007/0110240 A1 | 5/2007 | Moskowitz et al. |
| 2007/0113094 A1 | 5/2007 | Moskowitz et al. |
| 2007/0127717 A1 | 6/2007 | Herre et al. |
| 2007/0226506 A1 | 9/2007 | Moskowitz |
| 2007/0253594 A1 | 11/2007 | Lu et al. |
| 2007/0294536 A1 | 12/2007 | Moskowitz et al. |
| 2007/0300072 A1 | 12/2007 | Moskowitz |
| 2007/0300073 A1 | 12/2007 | Moskowitz |
| 2008/0005571 A1 | 1/2008 | Moskowitz |
| 2008/0005572 A1 | 1/2008 | Moskowitz |
| 2008/0016365 A1 | 1/2008 | Moskowitz |
| 2008/0022113 A1 | 1/2008 | Moskowitz |
| 2008/0022114 A1 | 1/2008 | Moskowitz |
| 2008/0028222 A1 | 1/2008 | Moskowitz |
| 2008/0046742 A1 | 2/2008 | Moskowitz |
| 2008/0075277 A1 | 3/2008 | Moskowitz et al. |
| 2008/0109417 A1 | 5/2008 | Moskowitz |
| 2008/0133927 A1 | 6/2008 | Moskowitz et al. |
| 2008/0151934 A1 | 6/2008 | Moskowitz et al. |
| 2009/0037740 A1 | 2/2009 | Moskowitz |
| 2009/0089427 A1 | 4/2009 | Moskowitz et al. |
| 2009/0190754 A1 | 7/2009 | Moskowitz et al. |
| 2009/0210711 A1 | 8/2009 | Moskowitz |
| 2009/0220074 A1 | 9/2009 | Moskowitz et al. |
| 2010/0002904 A1 | 1/2010 | Moskowitz |
| 2010/0005308 A1 | 1/2010 | Moskowit |
| 2010/0064140 A1 | 3/2010 | Moskowitz |
| 2010/0077219 A1 | 3/2010 | Moskowitz |
| 2010/0077220 A1 | 3/2010 | Moskowitz |
| 2010/0098251 A1 | 4/2010 | Moskowitz |
| 2010/0106736 A1 | 4/2010 | Moskowitz |
| 2010/0153734 A1 | 6/2010 | Moskowitz |
| 2010/0182570 A1 | 7/2010 | Matsumoto |
| 2010/0202607 A1 | 8/2010 | Moskowitz |
| 2010/0220861 A1 | 9/2010 | Moskowitz |

FOREIGN PATENT DOCUMENTS

| | | |
|---|---|---|
| EP | 0581317 | 2/1994 |
| EP | 0581317 A2 | 2/1994 |
| EP | 0649261 | 4/1995 |
| EP | 0651554 | 5/1995 |
| EP | 0872073 | 7/1996 |
| EP | 1547337 | 3/2006 |
| EP | 1354276 | 12/2007 |
| NL | 1005523 | 9/1998 |
| WO | WO 9514289 | 5/1995 |
| WO | WO 9629795 | 9/1996 |
| WO | WO 9642151 | 12/1996 |
| WO | WO9701892 | 1/1997 |
| WO | WO9726733 | 1/1997 |
| WO | WO 9724833 | 7/1997 |
| WO | WO9726732 | 7/1997 |
| WO | WO9802864 | 7/1997 |
| WO | WO 9744736 | 11/1997 |
| WO | WO9802864 | 1/1998 |
| WO | WO9837513 | 8/1998 |
| WO | WO 9952271 | 10/1999 |
| WO | WO 9962044 | 12/1999 |
| WO | WO 9963443 | 12/1999 |
| WO | WO 0057643 | 9/2000 |
| WO | WO0118628 | 3/2001 |
| WO | WO0143026 | 6/2001 |
| WO | WO02003385 | 1/2002 |
| WO | WO02003385 A1 | 10/2002 |

OTHER PUBLICATIONS

U.S. Appl. No. 08/999,766, filed Jul. 23, 1997, entitled "Steganographic Method and Device", published as 7568100 Jul. 28, 2009.

EPO Application No. 96919405.9, entitled "Steganographic Method and Device"; published as EP0872073 (A2), Oct. 21, 1998.

U.S. Appl. No. 11/050,779, filed Feb. 7, 2005, entitled "Steganographic Method and Device", published as 20050177727 A1 Aug. 11, 2005.

U.S. Appl. No. 08/674,726, filed Jul. 2, 1996, entitled "Exchange Mechanisms for Digital Information Packages with Bandwidth Securitization, Multichannel Digital Watermarks, and Key Management", published as 7362775 Apr. 22, 2008.

U.S. Appl. No. 09/545,589, filed Apr. 7, 2000, entitled "Method and System for Digital Watermarking", published as 7007166 Feb. 28, 2006.

U.S. Appl. No. 11/244,213, filed Oct. 5, 2005, entitled "Method and System for Digital Watermarking", published as 2006-0101269 A1 May 11, 2006.

U.S. Appl. No. 11/649,026, filed Jan. 3, 2007, entitled "Method and System for Digital Watermarking", published as 2007-0113094 A1 May 17, 2007.

(56) References Cited

OTHER PUBLICATIONS

U.S. Appl. No. 09/046,627, filed Mar. 24, 1998, entitled "Method for Combining Transfer Function with Predetermined Key Creation", published as 6,598,162 Jul. 22, 2003.
U.S. Appl. No. 10/602,777, filed Jun. 25, 2003, entitled "Method for Combining Transfer Function with Predetermined Key Creation", published as 2004-0086119 A1 May 6, 2004.
U.S. Appl. No. 09/053,628, filed Apr. 2, 1998, entitled "Multiple Transform Utilization and Application for Secure Digital Watermarking", 6,205,249 Mar. 20, 2001.
U.S. Appl. No. 09/644,098, filed Aug. 23, 2000, entitled "Multiple Transform Utilization and Application for Secure Digital Watermarking", published as 7,035,409 Apr. 25, 2006.
Jap. App. No. 2000-542907, entitled "Multiple Transform Utilization and Application for Secure Digital Watermarking"; which is a JP national stage of PCT/US1999/007262, published as WO/1999/052271, Oct. 14, 1999.
U.S. Appl. No. 09/767,733, filed Jan. 24, 2001 entitled "Multiple Transform Utilization and Application for Secure Digital Watermarking", published as 2001-0010078 A1 Jul. 26, 2001.
U.S. Appl. No. 11/358,874, filed Feb. 21, 2006, entitled "Multiple Transform Utilization and Application for Secure Digital Watermarking", published as 2006-0140403 A1 Jun. 29, 2006.
U.S. Appl. No. 10/417,231, filed Apr. 17, 2003, entitled "Methods, Systems and Devices for Packet Watermarking and Efficient Provisioning of Bandwidth", published as 2003-0200439 A1 Oct. 23, 2003.
U.S. Appl. No. 09/789,711, filed Feb. 22, 2001, entitled "Optimization Methods for the Insertion, Protection, and Detection of Digital Watermarks in Digital Data", published as 2001-0029580 A1 Oct. 11, 2001.
U.S. Appl. No. 11/497,822, filed Aug. 2, 2006, entitled "Optimization Methods for the Insertion, Protection, and Detection of Digital Watermarks in Digital Data", published as 2007-0011458 A1 Jan. 11, 2007.
U.S. Appl. No. 11/599,964, filed Nov. 15, 2006, entitled "Optimization Methods for the Insertion, Protection, and Detection of Digital Watermarks in Digital Data", published as 2008-0046742 A1 Feb. 21, 2008.
U.S. Appl. No. 11/599,838, filed Nov. 15, 2006, entitled "Optimization Methods for the Insertion, Protection, and Detection of Digital Watermarks in Digital Data", published as 2007-0226506 A1 Sep. 27, 2007.
U.S. Appl. No. 10/369,344, filed Feb. 18, 2003, entitled "Optimization Methods for the Insertion, Protection, and Detection of Digital Watermarks in Digitized Data", published as 2003-0219143 A1 Nov. 27, 2003.
U.S. Appl. No. 11/482,654, filed Jul. 7, 2006, entitled "Optimization Methods for the Insertion, Protection, and Detection of Digital Watermarks in Digitized Data", published as 2006-0285722 A1 Dec. 21, 2006.
U.S. Appl. No. 09/594,719, filed Jun. 16, 2000, entitled "Utilizing Data Reduction in Steganographic and Cryptographic Systems", published as 7,123,718 Oct. 17, 2006.
U.S. Appl. No. 11/519,467, filed Sep. 12, 2006, entitled "Utilizing Data Reduction in Steganographic and Cryptographic Systems", published as 2007-0064940 A1 Mar. 22, 2007.
U.S. Appl. No. 09/731,040, filed Dec. 7, 2000, entitled "Systems, Methods and Devices for Trusted Transactions", 2002-0010684 A1 Jan. 24, 2002.
U.S. Appl. No. 11/512,701, filed Aug. 29, 2006, entitled "Systems, Methods and Devices for Trusted Transactions", published as 2007-0028113 A1 Feb. 1, 2007.
U.S. Appl. No. 10/049,101, filed Feb. 8, 2002, entitled "A Secure Personal Content Server", published as 7,475,246 Jan. 6, 2009.
PCT Application No. PCT/US00/21189, filed Aug. 4, 2000, entitled, "A Secure Personal Content Server", Pub. No. WO/2001/018628; Publication Date: Mar. 15, 2001.
U.S. Appl. No. 09/657,181, filed Sep. 7, 2000, entitled "Method and Device for Monitoring and Analyzing Signals", published as 7,346,472 Mar. 18, 2008.

U.S. Appl. No. 10/805,484, filed Mar. 22, 2004, entitled "Method and Device for Monitoring and Analyzing Signals", published as 2004-0243540 A1 Dec. 2, 2004.
U.S. Appl. No. 09/956,262, filed Sep. 20, 2001, entitled "Improved Security Based on Subliminal and Supraliminal Channels for Data Objects", published as 2002-0056041 A1 May 9, 2002.
U.S. Appl. No. 11/518,806, filed Sep. 11, 2006, entitled "Improved Security Based on Subliminal and Supraliminal Channels for Data Objects", 2008-0028222 A1 Jan. 31, 2008.
U.S. Appl. No. 11/026,234, filed Dec. 30, 2004, entitled "Z-Transform Implementation of Digital Watermarks", published as 2005-0135615 A1 Jun. 23, 2005.
U.S. Appl. No. 11/592,079, filed Nov. 2, 2006, entitled "Linear Predictive Coding Implementation of Digital Watermarks", published as 2007-0079131 A1 Apr. 5, 2007.
U.S. Appl. No. 09/731,039, filed Dec. 7, 2000, entitled "System and Methods for Permitting Open Access to Data Objects and for Securing Data within the Data Objects", published as 2002-0071556 A1 Jun. 13, 2002.
U.S. Appl. No. 11/647,861, filed Dec. 29, 2006, entitled "System and Methods for Permitting Open Access to Data Objects and for Securing Data within the Data Objects", published as 2007-0110240 A1 May 17, 2007.
Schneier, Bruce, Applied Cryptography, 2nd Ed., John Wiley & Sons, pp. 9-10, 1996.
Menezes, Alfred J., Handbook of Applied Cryptography, CRC Press, p. 46, 1997.
1997, Merriam-Webster's Collegiate Dictionary, 10th Ed., Merriam Webster, Inc., p. 207.
Brealy, et al., Principles of Corporate Finance, "Appendix A—Using Option Valuation Models", 1984, pp. 448-449.
Copeland, et al., Real Options: A Practitioner's Guide, 2001 pp. 106-107, 201-202, 204-208.
Sarkar, M. "An Assessment of Pricing Mechanisms for the Internet-A Regulatory Imperative", presented MIT Workshop on Internet Economics, Mar. 1995 http://www.press.vmich.edu/iep/works/SarkAsses.html on.
Crawford, D.W. "Pricing Network Usage: A Market for Bandwidth of Market Communication?" presented MIT Workshop on Internet Economics, Mar. 1995 http://www.press.vmich.edu/iep/works/CrawMarket.html on March.
Low, S.H., "Equilibrium Allocation and Pricing of Variable Resources Among User-Suppliers", 1988. http://www.citesear.nj.nec.com/366503.html.
Caronni, Germano, "Assuring Ownership Rights for Digital Images", published proceeds of reliable IT systems, v15 '95, H.H. Bruggemann and W. Gerhardt-Hackel (Ed) Viewing Publishing Company Germany 1995.
Zhao, Jian. "A WWW Service to Embed and Prove Digital Copyright Watermarks", Proc. of the European conf. on Multimedia Applications, Services & Techniques Louvain-La-Nevve Belgium May 1996.
Gruhl, Daniel et al., Echo Hiding. In Proceeding of the Workshop on Information Hiding. No. 1174 in Lecture Notes in Computer Science, Cambridge, England (May/Jun. 1996).
Oomen, A.W.J. et al., A Variable Bit Rate Buried Data Channel for Compact Disc, J.AudioEng. Sc., vol. 43, No. 1/2, pp. 23-28 (1995).
Ten Kate, W. et al., A New Surround-Stereo-Surround Coding Techniques, J. Audio Eng.Soc., vol. 40, No. 5, pp. 376-383 (1992).
Gerzon, Michael et al., A High Rate Buried Data Channel for Audio CD, presentation notes, Audio Engineering Soc. 94th Convention (1993).
Sklar, Bernard, Digital Communications, pp. 601-603 (1988).
Jayant, N. S. et al., Digital Coding of Waveforms, Prentice Hall Inc., Englewood Cliffs, NJ, pp. 486-509 (1984).
Bender, Walter R. et al., Techniques for Data Hiding, SPIE Int. Soc. Opt. Eng., vol. 2420, pp. 164-173, 1995.
Zhao, Jian et al., Embedding Robust Labels into Images for Copyright Protection, (xp 000571976), pp. 242-251, 1995.
Menezes, Alfred J., Handbook of Applied Cryptography, CRC Press, p. 175, 1997.
Schneier, Bruce, Applied Cryptography, 1st Ed., pp. 67-68, 1994.

(56) References Cited

OTHER PUBLICATIONS

Ten Kate, W. et al., "Digital Audio Carrying Extra Information", IEEE, CH 2847-2/90/0000-1097, (1990).
Van Schyndel, et al., "A digital Watermark," IEEE Int'l Computer Processing Conference, Austin,TX, Nov. 13-16, 1994, pp. 86-90.
Smith, et al. "Modulation and Information Hiding in Images", Springer Verlag, 1st Int'l Workshop, Cambridge, UK, May 30-Jun. 1, 1996, pp. 207-227.
1997, Kutter, Martin et al., "Digital Signature of Color Images Using Amplitude Modulation", SPIE-E197, vol. 3022, pp. 518-527.
Puate, Joan et al., "Using Fractal Compression Scheme to Embed a Digital Signature into an Image", SPIE-96 Proceedings, vol. 2915, Mar. 1997, pp. 108-118.
Swanson, Mitchell D.,et al., "Transparent Robust Image Watermarking", Proc. of the 1996 IEEE Int'l Conf. on Image Processing, vol. 111, 1996 , pp. 211-214.
Swanson, Mitchell D., et al. "Robust Data Hiding for Images", 7th IEEE Digital Signal Processing Workshop, Leon, Norway. Sep. 1-4, 1996, pp. 37-40.
Zhao, Jian et al., "Embedding Robust Labels into Images for Copyright Protection", Proceeding of the Know Right '95 Conference, pp. 242-251.
Koch, E., et al., "Towards Robust and Hidden Image Copyright Labeling", 1995 IEEE Workshop on Nonlinear Signal and Image Processing, Jun. 1995 Neos Marmaras pp. 4.
Van Schyandel, et al., "Towards a Robust Digital Watermark", Second Asain Image Processing Conference, Dec. 6-8, 1995, Singapore, vol. 2, pp. 504-508.
Tirkel,A.Z., "A Two-Dimensional Digital Watermark", DICTA '95, Univ. of Queensland, Brisbane, Dec. 5-8, 1995, pp. 7.
Tirkel,A.Z., "Image Watermarking—A Spread Spectrum Application", ISSSTA '96, Sep. 1996, Mainz, German, pp. 6.
O'Ruanaidh, et al. "Watermarking Digital Images for Copyright Protection", IEEE Proceedings, vol. 143, No. 4, Aug. 1996, pp. 250-256.
Cox, et al., Secure Spread Spectrum Watermarking for Multimedia, NEC Research Institute, Techinal Report 95-10, pp. 33.
Kahn, D., "The Code Breakers", The MacMillan Company, 1969, pp. xIII, 81-83, 513, 515, 522-526, 863.
Boney, et al., Digital Watermarks for Audio Signals, EVSIPCO, 96, pp. 473-480 (Mar. 14, 1997).
Dept. of Electrical Engineering, Del Ft University of Technology, Del ft the Netherlands, Cr.C. Langelaar et al.,"Copy Protection for Multimedia Data based on Labeling Techniques", Jul. 1996 9 pp.
F. Hartung, et al., "Digital Watermarking of Raw and Compressed Video", SPIE vol. 2952, pp. 205-213.
Craver, et al., "Can Invisible Watermarks Resolve Rightful Ownerships?", IBM Research Report, RC 20509 (Jul. 25, 1996) 21 pp.
Press, et al., "Numerical Recipes in C", Cambridge Univ. Press, 1988, pp. 398-417.
Pohlmann, Ken C., "Principles of Digital Audio", 3rd Ed., 1995, pp. 32-37, 40-48:138, 147-149, 332, 333, 364, 499-501, 508-509, 564-571.
Pohlmann, Ken C., "Principles of Digital Audio", 2nd Ed., 1991, pp. 1-9, 19-25, 30-33, 41-48, 54-57, 86-107, 375-387.
Schneier, Bruce, Applied Cryptography, John Wiley & Sons, Inc., New York, 1994, pp. 68, 69, 387-392, 1-57, 273-275, 321-324.
Boney, et al., Digital Watermarks for Audio Signals, Proceedings of the International Conf. on Multimedia Computing and Systems, Jun. 17-23, 1996 Hiroshima, Japan, 0-8186-7436-9196, pp. 473-480.
Johnson, et al., "Transform Permuted Watermarking for Copyright Protection of Digital Video", IEEE Globecom 1998, Nov. 8-12, 1998, New York New York vol. 2 1998 pp. 684-689 (ISBN 0-7803-4985-7).
Rivest, et al., "Pay Word and Micromint: Two Simple Micropayment Schemes," MIT Laboratory for Computer Science, Cambridge, MA, May 7, 1996 pp. 1-18.
Bender, et al., "Techniques for Data Hiding", IBM Systems Journal, (1996) vol. 35, Nos. 3 & 4,1996, pp. 313-336.
Moskowitz, "Bandwith as Currency", IEEE Multimedia, Jan.-Mar. 2003, pp. 14-21.
Moskowitz, Multimedia Security Technologies for Digital Rights Management, 2006, Academic Press, "Introduction—Digital Rights Management" pp. 3-22.
Rivest, et al., "PayWord and Micromint: Two Simple Micropayment Schemes," MIT Laboratory for Computer Science, Cambridge, MA, Apr. 27, 2001, pp. 1-18.
Tomsich, et al., "Towards a secure and de-centralized digital watermarking infrastructure for the protection of Intellectual Property", in Electronic Commerce and Web Technologies, Proceedings (ECWEB)(2000).
Moskowitz, "What is Acceptable Quality in the Application of Digital Watermarking: Trade-offs of Security; Robustness and Quality", IEEE Computer Society Proceedings of ITCC 2002 Apr. 10, 2002 pp. 80-84.
Lemma, et al. "Secure Watermark Embedding through Partial Encryption", International Workshop on Digital Watermarking ("IWDW" 2006). Springer Lecture Notes in Computer Science 2006 (to appear) 13.
Kocher, et al., "Self Protecting Digital Content", Technical Report from the CRI Content Security Research Initiative, Cryptography Research, Inc. 2002-2003 14 pages.
Sirbu, M. et al., "Net Bill: An Internet Commerce System Optimized for Network Delivered Services", Digest of Papers of the Computer Society Computer Conference (Spring) Mar. 5, 1995 pp. 20-25 vol. CONF40.
Schunter, M. et al., "A Status Report on the Semper framework for Secure Electronic Commerce", Computer Networks and ISDN Systems, Sep. 30, 1998, pp. 1501-1510 vol. 30 No. 16-18 NL North Holland.
Konrad, K. et al., "Trust and Electronic Commerce—more than a technical problem," Proceedings of the 18th IEEE Symposium on Reliable Distributed Systems Oct. 19-22, 1999, pp. 360-365 Lausanne.
Kini, et al., "Trust in Electronic Commerce: Definition and Theoretical Considerations", Proceedings of the 31st Hawaii Int'l Conf on System Sciences (Cat. No. 98TB100216). Jan. 6-9, 1998. pp. 51-61. Los.
Steinauer D. D., et al., "Trust and Traceability in Electronic Commerce", Standard View, Sep. 1997, pp. 118-124, vol. 5 No. 3, ACM, USA.
Hartung, et al. "Multimedia Watermarking Techniques", Proceedings of the IEEE, Special Issue, Identification & Protection of Multimedia Information, pp. 1079-1107 Jul. 1999 vol. 87 No. 7 IEEE.
European Search Report & European Search Opinion in EP07112420.
Staind (The Singles 1996-2006), Warner Music—Atlantic, Pre-Release CD image, 2006, 1 page.
Radiohead ("Hail to the Thief"), EMI Music Group—Capitol, Pre-Release CD image, 2003, 1 page.
U.S. Appl. No. 60/169,274, filed Dec. 7, 1999, entitled "Systems, Methods and Devices for Trusted Transactions".
U.S. Appl. No. 60/234,199, filed Sep. 20, 2000, "Improved Security Based on Subliminal and Supraliminal Channels for Data Objects".
U.S. Appl. No. 09/671,739, filed Sep. 29, 2000, entitled "Method and Device for Monitoring and Analyzing Signals".
Tirkel, A.Z., "A Two-Dimensional Digital Watermark", Scientific Technology, 686, 14, date unknown. (citation revised upon review on Nov. 16, 2010 by Ran.).
PCT International Search Report in PCT/US95/08159.
PCT International Search Report in PCT/US96/10257.
Supplementary European Search Report in EP 96919405.
PCT International Search Report in PCT/US97/00651.
PCT International Search Report in PCT/US97/00652.
PCT International Search Report in PCT/US97/11455.
PCT International Search Report in PCT/US99/07262.
PCT International Search Report in PCT/US00/06522.
Supplementary European Search Report in EP00919398.
PCT International Search Report in PCT/US00/18411.
PCT International Search Report in PCT/US00/33126.
PCT International Search Report in PCT/US00/21189.
Delaigle, J.-F., et al. "Digital Watermarking," Proceedings of the SPIE, vol. 2659, Feb. 1, 1996, pp. 99-110.

(56) References Cited

OTHER PUBLICATIONS

Schneider, M., et al. "A Robust Content Based Digital Signature for Image Authentication," Proceedings of the International Conference on Image Processing (IC. Lausanne) Sep. 16-19, 1996, pp. 227-230, IEEE ISBN.
Cox, I. J., et al. "Secure Spread Spectrum Watermarking for Multimedia," IEEE Transactions on Image Processing, vol. 6 No. 12, Dec. 1, 1997, pp. 1673-1686.
Wong, Ping Wah. "A Public Key Watermark for Image Verification and Authentication," IEEE International Conference on Image Processing, vol. 1 Oct. 4-7, 1998, pp. 455-459.
Fabien A.P. Petitcolas, Ross J. Anderson and Markkus G. Kuhn, "Attacks on Copyright Marking Systems," LNCS, vol. 1525, Apr. 14-17, 1998, pp. 218-238 ISBN: 3-540-65386-4.
Ross Anderson, "Stretching the Limits of Steganography," LNCS, vol. 1174, May/Jun. 1996, 10 pages, ISBN: 3-540-61996-8.
Joseph J.K. O'Ruanaidh and Thierry Pun, "Rotation, Scale and Translation Invariant Digital Image Watermarking", pre-publication, Summer 1997 4 pages.
Joseph J.K. O'Ruanaidh and Thierry Pun, "Rotation, Scale and Translation Invariant Digital Image Watermarking", Submitted to Signal Processing Aug. 21, 1997, 19 pages.
OASIS (Dig Out Your Soul), Big Brother Recordings Ltd, Promotional CD image, 2008, 1 page.
Rivest, R. "Chaffing and Winnowing: Confidentiality without Encryption", MIT Lab for Computer Science, http://people.csail.mit.edu/rivest/Chaffing.txt Apr. 24, 1998, 9 pp.
PortalPlayer, PP5002 digital media management system-on-chip, May 1, 2003, 4 pp.
VeriDisc, "The Search for a Rational Solution to Digital Rights Management (DRM)", http://64.244.235.240/news/whitepaper,/docs/veridisc.sub.--white.sub.--paper.pdf, 2001, 15 pp.
Cayre, et al., "Kerckhoffs-Based Embedding Security Classes for WOA Data Hiding", IEEE Transactions on Information Forensics and Security, vol. 3 No. 1, Mar. 2008, 15 pp.
Wayback Machine, dated Jan. 17, 1999, http://web.archive.org/web/19990117020420/http://www.netzero.com/, accessed on Feb. 19, 2008.
Namgoong, H., "An Integrated Approach to Legacy Data for Multimedia Applications", Proceedings of the 23rd EUROMICRO Conference, vol., Issue 1-4, Sep. 1997, pp. 387-391.
Wayback Machine, dated Aug. 26, 2007, http://web.archive,org/web/20070826151732/http://www.screenplaysmag.com/t-abid/96/articleType/ArticleView/artcleId/495/Default.aspx/.
"YouTube Copyright Policy: Video Identification tool—YouTube Help", accessed Jun. 4, 2009, http://www.google.com/support/youtube/bin/answer.py?hl=en&answer=83766, 3 pp.
U.S. Appl. No. 12/665,002, filed Dec. 22, 2009, entitled "Method for Combining Transfer Function with Predetermined Key Creation", published as 20100182570 A1 Jul. 22, 2010, P76.
U.S. Appl. No. 12/592,331, filed Nov. 23, 2009, entitled "Optimization Methods for the Insertion, Protection, and Detection of Digital Watermarks in Digital Data", published as 20100077220 A1 Mar. 25, 2010, P77.
U.S. Appl. No. 12/590,553, filed Nov. 10, 2009, entitled "Optimization Methods for the Insertion, Protection, and Detection of Digital Watermarks in Digital Data", published as 20100077219 A1 Mar. 25, 2010, P78.
U.S. Appl. No. 12/590,681, filed Nov. 12, 2009, entitled "Optimization Methods for the Insertion, Protection, and Detection of Digital Watermarks in Digital Data", published as 20100064140 A1 Mar. 11, 2010, P79.
U.S. Appl. No. 12/655,036, filed Dec. 22, 2009, entitled "Utilizing Data Reduction in Steganographic and Cryptographic Systems", published as 20100153734 A1 Jun. 17, 2010, P80.

U.S. Appl. No. 12/655,357, filed Dec. 22, 2009, entitled "Method and Device for Monitoring and Analyzing Signals", published as 20100106736 A1 Apr. 29, 2010, P81.
PCT Application No. PCT/US95/08159, filed Jun. 26, 1995, entitled, "Digital Information Commodities Exchange with Virtual Menuing", published as WO/1997/001892; Publication Date: Jan. 16, 1997, F24.
PCT Application No. PCT/US96/10257, filed Jun. 7, 1996, entitled "Steganographic Method and Device"—corresponding to—EPO Application No. 96919405.9, entitled "Steganographic Method and Device", published as WO/1996/042151; Publication Date: Dec. 27, 1996; F19.
PCT Application No. PCT/US97/00651, filed Jan. 16, 1997, entitled, "Method for Stega-Cipher Protection of Computer Code", published as WO/1997/026732; Publication Date: Jul. 24, 1997.
PCT Application No. PCT/US97/00652, filed Jan. 17, 1997, entitled, "Method for an Encrypted Digital Watermark", published as WO/1997/026733; Publication Date: Jul. 24, 1997.
PCT Application No. PCT/US97/11455, filed Jul. 2, 1997, entitled, "Optimization Methods for the Insertion, Protection and Detection of Digital Watermarks in Digitized Data", published as WO/1998/002864; Publication Date: Jan. 22, 1998.
PCT Application No. PCT/US99/07262, filed Apr. 2, 1999, entitled, "Multiple Transform Utilization and Applications for Secure Digital Watermarking", published as WO/1999/052271; Publication Date: Oct. 14, 1999.
PCT Application No. PCT/US00/06522, filed Mar. 14, 2000, entitled, "Utilizing Data Reduction in Steganographic and Cryptographic Systems", published as WO/2000/057643; Publication Date: Sep. 28, 2000.
PCT Application No. PCT/US00/18411, filed Jul. 5, 2000, entitled, "Copy Protection of Digital Data Combining Steganographic and Cryptographic Techniques".
PCT Application No. PCT/US00/33126, filed Dec. 7, 2000, entitled "Systems, Methods and Devices for Trusted Transactions", published as WO/2001/043026; Publication Date: Jun. 14, 2001.
EPO Divisional Patent Application No. 07112420.0, entitled "Steganographic Method and Device" corresponding to PCT Application No. PCT/US96/10257, published as WO/1996/042151, Dec. 27, 1996.
U.S. Appl. No. 60/222,023, filed Jul. 31, 2007 entitled "Method and apparatus for recognizing sound and signals in high noise and distortion".
U.S. Appl. No. 11/458,639, filed Jul. 19, 2006 entitled "Methods and Systems for Inserting Watermarks in Digital Signals", published as 20060251291 A1 Nov. 9, 2006.
"Techniques for Data Hiding in Audio Files," by Morimoto, 1995.
Howe, Dennis Jul. 13, 1998 http://foldoc..org//steganography.
CSG, Computer Support Group and CSGNetwork.com 1973 http://www.csgnetwork.com/glossarys.html.
QuinStreet Inc. 2010 What is steganography?—A word definition from the Webopedia Computer Dictionary http://www.webopedia.com/terms/steganography.html.
Graham, Robert Aug. 21, 2000 "Hacking Lexicon" http://robertgraham.com/pubs/hacking-dict.html.
Farkex, Inc 2010 "Steganography definition of steganography in the Free Online Encyclopedia" http://encyclopedia2.Thefreedictionary.com/steganography.
Horowitz, et al., The Art of Eletronics. $2^{nd}$ Ed., 1989, pp. 7.
Jimmy eat world ("futures"), Interscope Records, Pre-Release CD image, 2004, 1 page.
Aerosmith ("Just Push Play"), Pre-Release CD image, 2001, 1 page.
Phil Collins(Testify) Atlantic, Pre-Release CD image, 2002, 1 page.

* cited by examiner

SECURE PERSONAL CONTENT SERVER

CROSS REFERENCE TO RELATED APPLICATIONS

This application is a continuation of U.S. application Ser. No. 12/287,443, filed Oct. 9, 2008 now U.S. Pat. No. 8,171,561, which is a continuation of U.S. application Ser. No. 10/049,101, which entered the US national stage Jul. 23, 2002 now U.S. Pat. No. 7,475,246, which is a national stage entry of PCT/US00/21189, filed Aug. 4, 2000, which claims the benefit of U.S. patent application Ser. No. 60/147,134, filed Aug. 4, 1999, entitled, "A Secure Personal Content Server" and U.S. patent application Ser. No. 60/213,489, filed Jun. 23, 2000, entitled "A Secure Personal Content Server." The contents of U.S. application Ser. No. 12/287,443 and U.S. application Ser. No. 10/049,101 are incorporated by reference in their entirety.

FIELD OF INVENTION

The present invention relates to the secure distribution of digitized value-added information, or media content, while preserving the ability of publishers to make available unsecured versions of the same value-added information, or media content, without adverse effect to the systems security.

Authentication, verification and authorization are all handled with a combination of cryptographic and steganographic protocols to achieve efficient, trusted, secure exchange of digital information.

This application also incorporates by reference the following applications: pending U.S. patent application Ser. No. 08/999,766, filed Jul. 23, 1997, entitled "Steganographic Method and Device"; pending U.S. patent application Ser. No. 08/772,222, filed Dec. 20, 1996, entitled "Z-Transform Implementation of Digital Watermarks" (issued as U.S. Pat. No. 6,078,664); pending U.S. patent application Ser. No. 09/456,319, filed Dec. 8, 1999, entitled "Z-Transform Implementation of Digital Watermarks" (issued as U.S. Pat. No. 6,853,726); pending U.S. patent application Ser. No. 08/674,726, filed Jul. 2, 1996, entitled "Exchange Mechanisms for Digital Information Packages with Bandwidth Securitization, Multichannel Digital Watermarks, and Key Management" (issued as U.S. Pat. No. 7,362,775); pending U.S. patent application Ser. No. 09/545,589, filed Apr. 7, 2000, entitled "Method and System for Digital Watermarking" (issued as U.S. Pat. No. 7,007,166); pending U.S. patent application Ser. No. 09/046,627, filed Mar. 24, 1998, entitled "Method for Combining Transfer Function with Predetermined Key Creation" (issued as U.S. Pat. No. 6,598,162); pending U.S. patent application Ser. No. 09/053,628, filed Apr. 2, 1998, entitled "Multiple Transform Utilization and Application for Secure Digital Watermarking" (issued as U.S. Pat. No. 6,205,249); pending U.S. patent application Ser. No. 09/281,279, filed Mar. 30, 1999, entitled "Optimization Methods for the Insertion, Protection, and Detection . . . " (issued as U.S. Pat. No. 6,522,767); U.S. patent application Ser. No. 09/594,719, filed Jun. 16, 2000, entitled "Utilizing Data Reduction in Steganographic and Cryptographic Systems" (issued as U.S. Pat. No. 7,123,718) (which is a continuation-in-part of PCT application No. PCT/US00/06522, filed 14 Mar. 2000, which PCT application claimed priority to U.S. Provisional Application No. 60/125,990, filed 24 Mar. 1999); and U.S. patent application Ser. No. 09/731,040, entitled "Systems, Methods and Devices for Trusted Transactions," filed Dec. 7, 2000 (issued as U.S. Pat. No. 7,159,116) which claimed priority to U.S. Application No. 60/169,274, filed Dec. 7, 1999, entitled "Systems, Methods And Devices For Trusted Transactions." All of the patent applications previously identified in this paragraph are hereby incorporated by reference, in their entireties, as if fully stated herein.

BACKGROUND OF THE INVENTION

The music industry is at a critical inflection point. Digital technology enables anyone to make perfect replica copies of musical recordings from the comfort of their home, or as in some circumstances, in an offshore factory. Internet technology enables anyone to distribute these copies to their friends, or the entire world. Indeed, virtually any popular recording is already available in the MP3 format, for free if you know where to look.

How the industry will respond to these challenges and protect the rights and livelihoods of copyright owners and managers and has been a matter of increasing discussion, both in private industry forums and the public media. Security disasters like the cracking of DVD-Video's CSS security system have increased doubt about the potential for effective robust security implementations. Meanwhile, the success of non-secure initiatives such as portable MP3 players lead many to believe that these decisions may have already been made.

Music consumers have grown accustomed to copying their music for their own personal use. This fact of life was written into law in the United States via the Audio Home Recording Act of 1992. Millions of consumers have CD players and purchase music in the Compact Disc format. It is expected to take years for a format transition away from Red Book CD Audio to reach significant market penetration.

Hence, a need exists for a new and improved system for protecting digital content against unauthorized copying and distribution.

SUMMARY OF THE INVENTION

A local content server system (LCS) for creating a secure environment for digital content is disclosed, which system comprises: a communications port in communication for connecting, the LCS via a network to at least one Secure Electronic Content Distributor (SECD), which SECD is capable of storing a plurality of data sets, is capable of receiving a request to transfer at least one content data set, and is capable of transmitting the at least one content data set in a secured transmission; a rewritable storage medium whereby content received from outside the LCS may be stored and retrieved; a domain processor that imposes rules and procedures for content being transferred between the LCS and devices outside the LCS; and a programmable address module which can be programmed with an identification code uniquely associated with the LCS. The LCS is provided with rules and procedures for accepting and transmitting con data. Optionally, the system may further comprise: an interface to permit the LES to communicate with one or more Satellite Units (SU) which may be connected to the system through the interface, which SUs are capable of receiving and transmitting digital content; at least one SU; and/or at least one SECD. The SECD may have a storage device for storing a plurality of data sets, as well as a transaction processor for validating the request to purchase and for processing payment for a request to retrieve one of the data sets. The SECD typically includes a security module for encrypting or otherwise securitizing data which the SEM may transmit.

A method for creating a secure environment for digital content for a consumer is also disclosed. As part of the method, a LCS requests and receives a digital data set that may be encrypted or scrambled. The digital data set may be embedded with at least one robust open watermark, which permits the content to be authenticated. The digital data set is preferably be embedded with additional watermarks which are generated using information about the LCS requesting the copy and/or the SECD which provides the copy. Once received by the LCS, the LCS exercises control over the content and only releases the data to authorized users. Generally, the data is not released until the LCS embeds at least one additional watermark based upon protected information associated with the LCS and/or information associated with the user.

Another embodiment of the method of the present invention comprises: connecting a Satellite Unit to an local content server (LCS), sending a message indicating that the SU is requesting a copy of a content data set that is stored on the LCS, said message including information about the identity of the SU; analyzing the message to confirm that the SU is authorized to use the LCS; retrieving a copy of the requested content data set; assessing whether a secured connection exists between the LCS and the SU; if a secured connection exists, embedding a watermark into the copy of the requested content data set, said watermark being created based upon information transmitted by the SU and information about the LCS; and delivering the content data set to the SU for its use.

The SU may also request information that is located not on the LCS, but on an SECD, which case, the LCS will request and obtain a copy from the SEED, provided the requesting SU is authorized to access the information.

Digital technology offers economies of scale to value-added data not possible with physical or tangible media distribution. The ability to digitize information both reduces the cost of copying and enables perfect copies. This is an advantage and a disadvantage to commercial publishers who must weigh the cost reduction against the real threat of unauthorized duplication of their value-added data content. Because cost reduction is an important business consideration, securing payment and authenticating individual copies of digital information (such as media content) presents unique opportunities to information service and media content providers. The present invention seeks to leverage the benefits of digital distribution to consumers and publishers alike, while ensuring the development and persistence of trust between all parties, as well as with any third parties involved, directly or indirectly, in a given transaction.

In another approach that is related to this goal, there are instances where transactions must be allowed to happen after perceptually-based digital information can be authenticated. (Perceptually based information is information whose value is in large part, based upon its ability to be perceived by a human, and includes for example, acoustic, psychoacoustic, visual and psychovisual information.) The process of authenticating before distributing will become increasingly important for areas where the distributed material is related to a trust-requiring transaction event. A number of examples exist. These include virtual retailers (for example, an on-line music store selling CDs and electronic versions of songs); service providers (for example, an on-line bank or broker who performs transactions on behalf of a consumer); and transaction providers (for example, wholesalers or auction houses). These parties have different authentication interests and requirements. By using the teachings of this application, these interests and requirements may be separated and then independently quantified by market participants in shorter periods of time.

All parties in a transaction must authenticate information that is perceptually observable before trust between the parties can be established. In today's world, information (including perceptually rich information) is typically digitized, and as a result, can easily be copied and redistributed, negatively impacting buyers, sellers and other market participants. Unauthorized redistribution confuses authenticity, non-repudiation, limit of ability and other important "transaction events." In a networked environment, transactions and interactions occur over a transmission line or a network, with buyer and seller at different points on the line or network. While such electronic transactions have the potential to add value to the underlying information being bought and sold (and the potential to reduce the cost of the transaction), instantaneous piracy can significantly reduce the value of the underlying data, if not wholly destroy it. Even the threat of piracy tends to undermine the value of the data that might otherwise exist for such an electronic transaction.

Related situations range from the ability to provably establish the "existence" of a virtual financial institution to determining the reliability of an "electronic stamp." The present invention seeks to improve on the prior art by describing optimal combinations of cryptographic and steganographic protocols for "trusted" verification, confidence and non-repudiation of digitized representations of perceptually rich information of the actual seller, vendor or other associated institutions which may not be commercial in nature (confidence building with logo's such as the SEC, FDIC, Federal Reserve, FBI, etc. apply). To the extent that an entity plays a role in purchase decisions made by a consumer of goods and services relating to data, the present invention has a wide range of beneficial applications. One is enabling independent trust based on real world representations that are not physically available to a consumer or user. A second is the ability to match informational needs between buyers and sellers that may not be universally appealing or cost effective in given market situations. These include auction models based on recognition of the interests or demand of consumers and market participants which make trading profitable by focusing specialized buyers and sellers. Another use for the information matching is to establish limits on the liability of such institutions and profit-seeking entities, such as insurance providers or credit companies. These vendors lack appropriate tools for determining intangible asset risk or even the value of the information being exchanged. By encouraging separate and distinct "trust" arrangements aver an electronic network, profitable market-based relationships can result.

The present invention can make possible efficient and openly accessible markets for tradable information. Existing transaction security (including on-line credit cards, electronic cash or its equivalents, electronic wallets, electronic tokens, etc.) which primarily use cryptographic techniques to secure a transmission channel—but are not directly associated or dependent on the information being sold—fails to meet this valuable need. The present invention proposes a departure from the prior art by separating transactions from authentication in the sale of digitized data. Such data may include videos, songs, images, electronic stamps, electronic trademarks, and electronic logos used to ensure membership in some institutional body whose purpose is to assist in a dispute, limit liability and provide indirect guidance to consumers and market participants, alike.

With an increasingly anonymous marketplace, the present invention offers invaluable embodiments to accomplish "trusted" transactions in amore flexible, transparent manner white enabling market participants to negotiate terms and conditions. Negotiation may be driven by predetermined usage rules or parameters, especially as the information economy offers potentially many competitive marketplaces in which to transact, trade or exchange among businesses and consumers. As information grows exponentially, flexibility becomes an advantage to market participants, in that they need to screen, filter and verify information before making a transaction decision. Moreover, the accuracy and speed at which decisions can be made reliably enables confidence to grow with an aggregate of "trusted transactions". "Trusted transactions" beget further "trusted transactions" through experience. The present invention also provides for improvements over the prior art in the ability to utilize different independently important "modules" to enable a "trusted transaction" using competitive cryptographic and steganographic elements, as well as being able to support a wide variety of perceptually-based media and information formats. The envisioned system is not bound by a proprietary means of creating recognition for a good or service, such as that embodied in existing closed system. Instead, the flexibility of the present invention will able a greater and more diverse information marketplace.

The present invention is not a "trusted system", per se, but "trusted transactions" are enabled, since the same value-added information that is sought may still be in the clear, not in a protected storage area or closed, rule-based "inaccessible virtual environment".

A related additional set of embodiments regards the further separation of the transaction and the consumers identification versus the identification of the transaction only. This is accomplished through separated "trusted transactions" bound by authentication, verification and authorization in a transparent manner. With these embodiments, consumer and vendor privacy could be incorporated. More sophisticated relationships are anticipated between parties, who can mix information about their physical goods and services with a transparent means for consumers, who may not be known to the seller, who choose not to confide in an inherently closed "trusted system" or provide additional personal information or purchasing information (in the form of a credit card or other electronic payment system), in advance of an actual purchase decision or ability to observe (audibly or visibly) the content in the clear. This dynamic is inconsistent with the prior art's emphasis on access control, not transparent access to value-added information (in the form or goods or services), that can be transacted on an electronic or otherwise anonymous exchange.

These embodiments may include decisions about availability of a particular good or service through electronic means, such as the Internet, or means that can be modularized to conduct a transaction based on interconnection of various users (such as WebTV, a Nintendo or Sony game console with network abilities, cellular phone, PalmPilot, etc.). These embodiments may additionally be implemented in traditional auction types (including Dutch auctions). Consumers may view their anonymous marketplace transactions very differently because of a lack of physical human interactions, but the present invention can enable realistic transactions to occur by maintaining open access and offering strict authentication and verification of the information being traded. This has the effect of allowing legacy relationships, legacy information, and legacy business models to be offered in a manner which more closely reflects many observable transactions in the physical world. The tremendous benefits to sellers and consumers is obvious; existing transactions need not reduce their expectations of security. As well, the ability to isolate and quantify aspects of a transaction by module potentially allows for better price determinations of intangible asset insurance, transaction costs, advertising costs, liability, etc. which have physical world precedent.

It is contemplated that the publisher and/or owner of the copyrights will want to dictate restrictions on the ability of the purchaser to use the data being sold. Such restrictions can be implemented through the present invention, which presents a significant advantage over the prior art (which attempts to effect security through access control and attempted tight reigns over distribution). See U.S. Pat. No. 5,428,606 for a discussion on democratizing digital information exchange between publishers and subscribers of said information.

A goal for providers of value-added content is to maximize profits for the sale of their content. Marketing and promotion of the informational content cannot be eliminated, considering the ever-increasing amount of information vying for consumers and other market participant's attention. Nonetheless, in a market where the goods are speculatively valued, marketing budgets are inherently constrained, as you are trying to create demand for a product with little inherent value. Where such markets have participants, both buyers and sellers and their respective agents, with access to the same information in real time, market mechanisms efficiently price the market goods or services. These markets are characterized by "price commoditization" so buyers and sellers are limited to differentiating their offerings by selection and service. If the markets are about information itself, it has proven more difficult to accurately forecast the target price where sellers can maximize their profits. Quality and quantity provide different evaluation criteria of selection and service relating to the information being traded. The present invention regards a particular set of implementations of value-added content security in markets which may include unsecured and secure versions of the same value-added data (such as songs, video, research, pictures, electronic logos, electronic trademarks, value-added information, etc.).

Transactions for value-added information can occur without any physical location. So, there is a need for a secure personal content server for which the value added information can be offered for transactions in a manner similar to real world transactions. One feature is to offer seemingly similar value added information in differing quality settings. These settings have logical relationships with fidelity and discreteness and are determined by market participants. Another issue is that because purchasers may be anonymous to sellers, it is more important to have a particular value-added information object available so that market participants can fulfill their role are consumers.

One fundamental weakness of current information markets is the tack of mechanisms to ensure that buyers and sellers can reach pricing equilibrium. This deficit is related to the "speculative", "fashion", and "vanity" aspects of perceptual content (such as music, video, and art or some future recognition to purchasers). For other goods and services being marketed to an anonymous marketplace, market participants may never see (and indeed, may choose to never see, an actual location where the transaction may physically occur. A physical location may simply not exist. There are a number of such virtual operations in business today, which would benefit from the improvements offered under the present system.

The present invention also seeks to provide improvements to the art in enabling a realistic model for building trust between parties (or their agents) not in a "system", per se. Because prior art systems lack any inherent ability to allow for information to flow freely to enable buyers and sellers to react to changing market conditions. The present invention can co-exist with these "trusted systems" to the extent that all market participants in a given industry have relatively similar information with which to price value-added data. The improvement over such systems, however, addresses a core features in most data-added value markets: predictions, forecasts, and speculation over the value of information is largely an unsuccessful activity for buyers and sellers alike. The additional improvement is the ability to maintain security even with unsecured or legacy versions of value-added information available to those who seek choices that fit less quantitative criteria—"aesthetic quality" of the information versus "commercial price". Purchase or transaction decisions can be made first by authenticating an electronic version of a song, image, video, trademark, stamp, currency, etc.

Additional anticipated improvements include the ability to support varying pricing models such as auctions that are difficult or impossible to accomplish under existing prior art that leaves all access and pricing control with the seller alone, and the separation of the transaction from the exchange of the value-added information, which gives more control to buyers over their identities and purchasing habits, (both sensitive and separately distinct forms of "unrelated" value-added information). Essentially, no system known in the art allows for realistic protocols to establish trust between buyers and sellers in a manner more closely reflecting actual purchasing behavior of consumers and changing selling behavior of sellers. The goal in such transactions is the creation of trust between parties as well as "trusted relationships" with those parties. The present invention is an example of one such system for media content where the "aesthetic" or "gestalt" of the underlying content and its characteristics is a component of buying habits. Without an ability to open distribution systems to varying buyers and sellers, media content may be priced at less than maximum economic value and buyers may be deprived of a competitive, vigorous marketplace for exciting media content from many different creative participants.

To the extent that recognition plays such a key role in an information economy, value-added data should be as accessible as possible to the highest number of market participants in the interests of furthering creativity and building a competitive marketplace for related goods and services. This is to the benefit of both buyers and sellers as well as the other participants in such an economic ecosystem. The Internet and other transmission-based transactions with unknown parties presents a number of challenges to information vendors who wish to develop customer relations, trust and profitable sales. The information economy is largely an anonymous marketplace, thus, making it much more difficult to identify consumers and sellers. The present invention provides remedies to help overcome these weaknesses.

The present invention is concerned with methods and systems which enable secure, paid exchange of value-added information, while separating transaction protocols. The present invention improves on existing means for distribution control by relying on authentication, verification and authorization that may be flexibly determined by both buyers and sellers. These determinations may not need to be predetermined, although pricing matrix and variable access to the information opens additional advantages over the prior art. The present invention offers methods and protocols for ensuring value-added information distribution can be used to facilitate trust in a large or relatively anonymous marketplace (such as the Internet's World Wide Web).

We now define components of the preferred embodiments for methods, systems, and devices.

DEFINITIONS

Local Content Server (LCS): A device or software application which can securely store a collection of value-added digital content. The LCS has a unique ID.

Secure Electronic Content Distributor (SECD): An entity, device or software application which can validate a transaction with a LCS, process a payment, and deliver digital content securely to a LCS. In cryptographic terms, the SECD acts as a "certification authority" or its equivalent. SECDs may have differing arrangements with consumers and providers of value-added information. (The term "content" is used to refer generally to digital data, and may comprise video, audio, or any other data that is stored in a digital format).

Satellite Unit (SU): A portable medium or device which can accept secure digital content from a LCS through a physical, local connection and which can either play or make playable the digital content. The SU may have other functionality as it relates to manipulating the content, such as recording. The SU has a unique ID. An SU may be a CD player, a video camera, a backup drive, or other electronic device which has a storage unit for digital data.

LCS Domain: A secure medium or area where digital content can be stored, with an accompanying rule system for transfer of digital content in and out of the LCS Domain. The domain may be a single device or multiple devices—all of which have some common ownership or control. Preferably, a LCS domain is linked to a single purchasing account. Inside the domain, one can enjoy music or other digital data without substantial limitations—as typically a license extends to all personal use.

SecureChannel™: A secure channel to pass individualized content to differentiate authentic content from legacy or unauthorized, pirated content. For example, the Secure Channel may be used as an auxiliary channel through which members of the production and distribution chain may communicate directly with individual consumers. Preferably, the Secure Channel is never exposed and can only be accessed through legitimate methods. SecureChannel may carry a value-adding component (VAC). The ability to provide consumers with value adding features will serve to give consumers an incentive to purchase new, secure hardware and software that can provide the additional enhanced services. The SecureChannel may also include protected associated data ("PAD")—data which is associated with a user and/or a particular set of content.

Standard Quality: A transfer path into the LCS Domain which maintains the digital content at a predetermined reference level or degrades the content if it is at a higher quality level. In an audio implementation, this might be defined as Red Book CD Quality (44100 Hz., 16 bits, 2 channels). This transfer path can alternately be defined in terms of a subset of VAC's or a quality level associated with particular VAC's. If a VAC is not in the subset, it is not passed. If a VAC is above the defined quality level, it is degraded.

Low Quality: A transfer path into the LCS Domain which degrades the digital content to a sub-reference level. In an audio implementation, this might be defined as below CD Quality (for instance, 32000 Hz, 16 bits, 2 channels). This transfer path can alternately be defined terms of an absence of VAC's or a degraded quality level associated with particular VAC's.

High Quality: A transfer path into the LCS Domain which allows digital content of any quality level to pass unaltered. This transfer path can alternately be defined in terms of a complete set of VAC's or the highest quality level available associated with particular VAC's.

Rewritable Media: An mass storage device which can be rewritten e.g. hard drive, CD-RW, Zip cartridge, M-O drive, etc. . . . ).

Read-Only Media: A mass storage device which can only be written once (e.g. CD-ROM, CD-R, DVD, DVD-R, etc. . . . ). Note: pre-recorded music, video, software, or images, etc. are all "read only" media.

Unique ID: A Unique ID is created for a particular transaction and is unique to that transaction (roughly analogous to a human fingerprint). One way to generate a Unique ID is with a one-way hash function. Another way is by incorporating the hash result with a message into a signing algorithm will create a signature scheme. For example, the hash result may be concatenated to the digitized, value added information which is the subject of a transaction. Additional uniqueness may be observed in a hardware device so as to differentiate that device, which may be used in a plurality of transactions, from other similar devices.

Value-added: Value-added information is differentiated from non-commoditized information in terms of its marketability or demand, which can vary, obviously, from each market that is created for the information. By way of example, information in the abstract has no value until a market is created for the information (i.e., the information becomes a commodity). The same information can be packaged in many different forms, each of which may have different values. Because information is easily digitized, one way to package the "same" information differently is by different levels of fidelity and discreteness. Value is typically bounded by context and consideration.

Authentication: A receiver of a "message" (embedded or otherwise within the value-added information) should be able to ascertain the original of the message (or by effects, the origin of the carrier within which the message is stored). An intruder should not be able to successfully represent someone else. Additional functionality such as Message Authentication Codes (MAC) could be incorporated (a one-way hash function with a secret key) to ensure limited verification or subsequent processing of value-added data.

Verification: In cryptographic terms, "verification" serves the "integrity" function to prevent an intruder from substituting false messages for legitimate ones. In this sense, the receiver of the message (embedded or otherwise present within the value-added information) should be assured that the message was not modified or altered in transit.

One-way hash function: One-way hash functions are known in the art. A hash function is a function which converts an input into an output, which is usually fixed-sized output. For example, a simple hash function may be a function which accepts a digital stream of bytes and returns a byte consisting of the XOR function of all of the bytes in the digital stream of input data. Roughly speaking, the hash function may be used to generate a "fingerprint" for the input data. The hash function need not be chosen based on the characteristics of the input. Moreover, the output produced by the hash function (i.e., the "hash") need not be secret, because in most instances it is not computationally feasible to reconstruct the input which yielded the hash. This is especially true for a "one-way" hash function—one that can be used to generate a hash value for a given input string, but which hash cannot be used (at least, not without great effort) to create an input string that could generate the same hash value.

Authorization: A term which is used broadly to cover the acts of conveying official sanction, permitting access or granting legal power to an entity.

Encryption: For non digitally-sampled data, encryption is data scrambling using keys. For value-added or information rich data with content characteristics, encryption is typically slow or inefficient because content file sizes tend to be generally large. Encrypted data is called "ciphertext".

Scrambling: For digitally-sampled data, scrambling refers to manipulations of the value-added or information rich data at the inherent granularity of the file format. The manipulations are associated with a key, which may be made cryptographically secure or broken into key pairs. Scrambling is efficient for larger media files and can be used to provide content in less than commercially viable or referenced quality levels. Scrambling is not as secure as encryption for these applications, but provides more fitting manipulation of media rich content in the context of secured distribution. Scrambled data is also called "ciphertext" for the purposes of this invention. Encryption generally acts on the data as a whole, whereas scrambling is applied often to a particular subset of the data concerned with the granularity of the data, for instance the file formatting. The result is that a smaller amount of data is "encoded" or "processed" versus strict encryption, where all of the data is "encoded" or "processed." By way of example, a cable TV signal can be scrambled by altering the signal which provides for horizontal and vertical tracking, which would alter only a subset of the data, but not all of the data—which is why the audio signal is often untouched. Encryption, however, would generally so alter the data that no recognizable signal would be perceptually appreciated. Further, the scrambled data can be compared with the unscrambled data to yield the scrambling key. The difference with encryption is that the ciphertext is not completely random, that is, the scrambled data is still perceptible albeit in a lessened quality. Unlike watermarking, which maps a change to the data, set, scrambling is a transfer function which does not alter or modify the data set.

DETAILED DISCUSSION OF INVENTION

The LCS Domain is a logical area inside which a set of rules governing content use can be strictly enforced. The exact rules can vary between implementations, but in general, unrestricted access to the content inside the LCS Domain is disallowed. The LCS Domain has a set of paths which allow content to enter the domain under different circumstances. The LCS Domain also has paths which allow the content to exit the domain.

A simple example provides insight into the scope of an LCS domain. If an LCS is assigned to an individual, then all music, video, and other content data which has lawfully issued to the individual may be freely used on that persons LCS domain (though perhaps "freely" is misleading, as in theory, the individual has purchased a license). A LCS Domain may comprise multiple SUs, for example, a video player, a CD player, etc. An individual may be authorized to take a copy of a song and play it in another's car stereo, but only while the individual's device or media is present. Once the device is removed, the friend's LCS will no longer have a copy of the music to play.

The act of entering the LCS Domain includes a verification of the content (an authentication check). Depending upon the source of the content, such verification may be easier or harder. Unvalidateable content will be subjected to a quality degradation. Content that can be validated but which belongs to a different LCS Domain will be excluded. The primary purpose of the validation is to prevent unauthorized, high-quality, sharing of content between domains.

When content leaves the LCS Domain, the exiting content is embedded with information to uniquely identify the exiting content as belonging to the domain from which the content is leaving. It is allowed to leave at the quality level at which the content was originally stored in the LCS Domain (i.e. the quality level determined by the validation path). For example, the exiting content may include an embedded digital watermark and an attached hash or digital signature; the exiting content may also include a time stamp—which itself may be embedded or merely attached). Once it has exited, the content cannot return to the domain unless both the watermark and hash can be verified as belonging to this domain. The presence of one or the other may be sufficient to allow re-entry, or security can be set to require the presence of more than one identification signal.

This system is designed to allow a certifiable level of security for high-quality content while allowing a device to also be usable with unsecured content at a degraded quality level. The security measures are designed such that a removal of the watermark constitutes only a partial failure of the system. The altered content (i.e., the content from which the watermark has been removed or the content in which the watermark has been degraded) will be allowed back into the Domain, but only at a degraded quality level, a result of the watermark destruction and subsequent obscurity to the system, consumers will not be affected to the extent that the unauthorized content has only been degraded, but access has not been denied to the content. Only a complete forgery of a cryptographically-secure watermark will constitute a complete failure of the system. For a discussion on such implementations please see U.S. Pat. No. 5,613,004, U.S. Pat. No. 5,687,236, U.S. Pat. No. 5,745,569, U.S. Pat. No. 5,822,432, U.S. Pat. No. 5,889,868, U.S. Pat. No. 5,905,800, included by reference in their entirety and pending U.S. patent applications with Ser. No. 09/046,627 "Method for Combining Transfer Function . . . " (issued as U.S. Pat. No. 6,598,162), Ser. No. 09/053,628 "Multiple Transform Utilization and Application for Secure Digital Watermarking" (issued as U.S. Pat. No. 6,205,249), Ser. No. 08/775,216 "Steganographic Method and Device" (issued as U.S. Pat. No. 5,687,236), Ser. No. 08/772,222 "Z-Transform Implementation" (issued as U.S. Pat. No. 6,078,664), Ser. No. 60/125,990 "Utilizing Data Reduction in Steganographic and Cryptographic Systems" which corresponds to U.S. patent application Ser. No. 09/594,719, filed Jun. 16, 2000, entitled "Utilizing Data Reduction in Steganographic and Cryptographic Systems" (issued as U.S. Pat. No. 7,123,718).

Provable security protocols can minimize this risk. Thus the embedding system used to place the watermark does not need to be optimized for robustness, only for imperceptibility (important to publishers and consumers alike) and security (more important to publishers than to consumers). Ideally, as previously disclosed, security should not obscure the content, or prevent market participants from accessing information, which in the long term, should help develop trust or create relationships.

The system can flexibly support one or more "robust" watermarks as a method for screening content to speed processing. Final validation, however, relies upon the fragile, secure watermark and its hash or digital signature (a secure time stamp may also be incorporated). Fragile watermarks, meaning that signal manipulations would affect the watermark, may be included as a means to affect the quality of the content or any additional attributes intended to be delivered to the consumer.

LCS Functions

The LCS provides storage for content, authentication of content, enforcement of export rules, and watermarking and hashing of exported content. Stored content may be on an accessible rewritable medium, but it must be stored as ciphertext (encrypted or scrambled), not plain text, to prevent system-level extraction of the content. This is in contrast to the prior art which affix or otherwise attach meta-data to the content for access control by the variously proposed systems.

Typically, an LCS receives secured data from one or more SECDs. The SECD transfers content only after it has been secured. For example, the SECD may use an individualized cryptographic container to protect music content while in transit. Such a container may use public/private key cryptography, ciphering and/or compression, if desired.

The LCS may be able to receive content from a SECD, and must be able to authenticate content received via any of the plurality of implemented paths. The LCS must monitor and enforce any rules that accompany received content, such as number of available copies. Finally, it is preferred for the LCS to watermark all exported material (with the exception of Path 6—see below) and supply a hash made from the unique ID of the LCS and the content characteristics (so as to be maintained perceptually within the information and increase the level of security of the watermark).

SU Functions

The SU enables the content to be usable away from the LCS. The SU is partially within the LCS Domain. A protocol must exist for the SU and LCS to authenticate any connection made between them. This connection can have various levels of confidence set by the level of security between the SU and LCS and determinable by a certification authority or its equivalent, an authorized site for the content, for example. The transfer of content from the SU to the LCS without watermarking is allowed. However, all content leaving the SU must be watermarked. Preferably, the SU watermark contains a hash generated from the SU's Unique ID and the content characteristics of the content being transferred. If the content came from a LCS, the SU watermark must also be generated based, in part, upon the hash received from the LCS. The LCS and SU watermarking procedures do not need to be the same. However, the LCS must be able to read the SU watermarks for all different types of SU's with which it can connect. The SU does not need to be able to read any LCS watermarks. Each LCS and SU must have separate Unique IDs.

Sample Embodiment

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE INVENTION

The preferred embodiment of the present invention and its advantages are best understood by referring to FIGS. 1 through 7 of the drawings, like numerals being used for like and corresponding parts of the various drawings.

Figure 1:
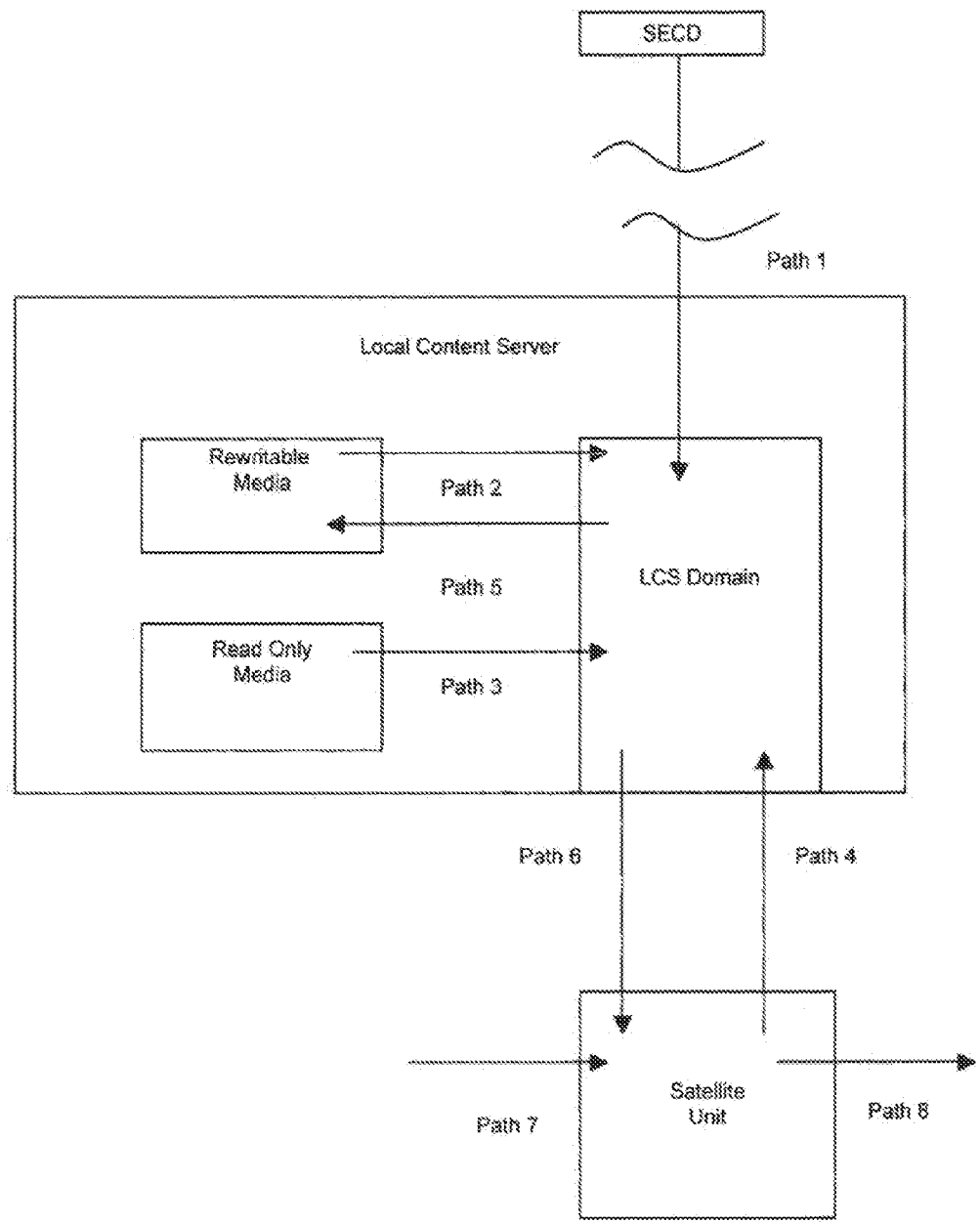
FIG. 1 shows in block diagram form a system for one embodiment of an LCS, showing the possible paths for content to enter and exit the system.

FIG. 1 is a block diagram showing the components of a sample LCS system and showing the possible paths for content to enter and leave the LCS. In the embodiment of FIG. 1, the LCS is a general purpose computing device such as a PC with software loaded to emulate the functions of a LCS. The LCS of FIG. 1 has a Rewritable media (such as a hard drive), a Read-Only media (such as a CD-ROM drive), and software to control access (which software, in effect, defines the "LCS Domain"). The Secure Electronic Content Distributor (SECD) is connected via a network (such as the Internet, intranet, cable, satellite link, cellular communications network, or other commonly accepted network). The Satellite Unite (SU) is a portable player which connects to the LCS and/or to other players where applicable (for example by way of a serial interface, USB, IEEE 1394, infrared, or other commonly used interface protocol). FIG. 1 also identifies seven (7) path ways.

Path 1 depicts a secure distribution of digital content from a SECD to a LCS. The content can be secured during the transmission using one or more 'security protocols' (e.g., encryption or scrambling). Moreover, a single LCS may have the capability to receive content transmissions from multiple SECDs, and each SECD may use the same security protocols or different security protocols. In the context of FIG. 1, however, only a single SECD is displayed. It is also contemplated that the same SECD may periodically or randomly use different security protocols. A typical security protocol uses an asymmetric cryptographic system, an example being a public key cryptography system where private and public key pairs allow the LCS to authenticate and accept the received content. Another security protocol may involve the ability to authenticate the received content using a signature scheme.

Figure 2:
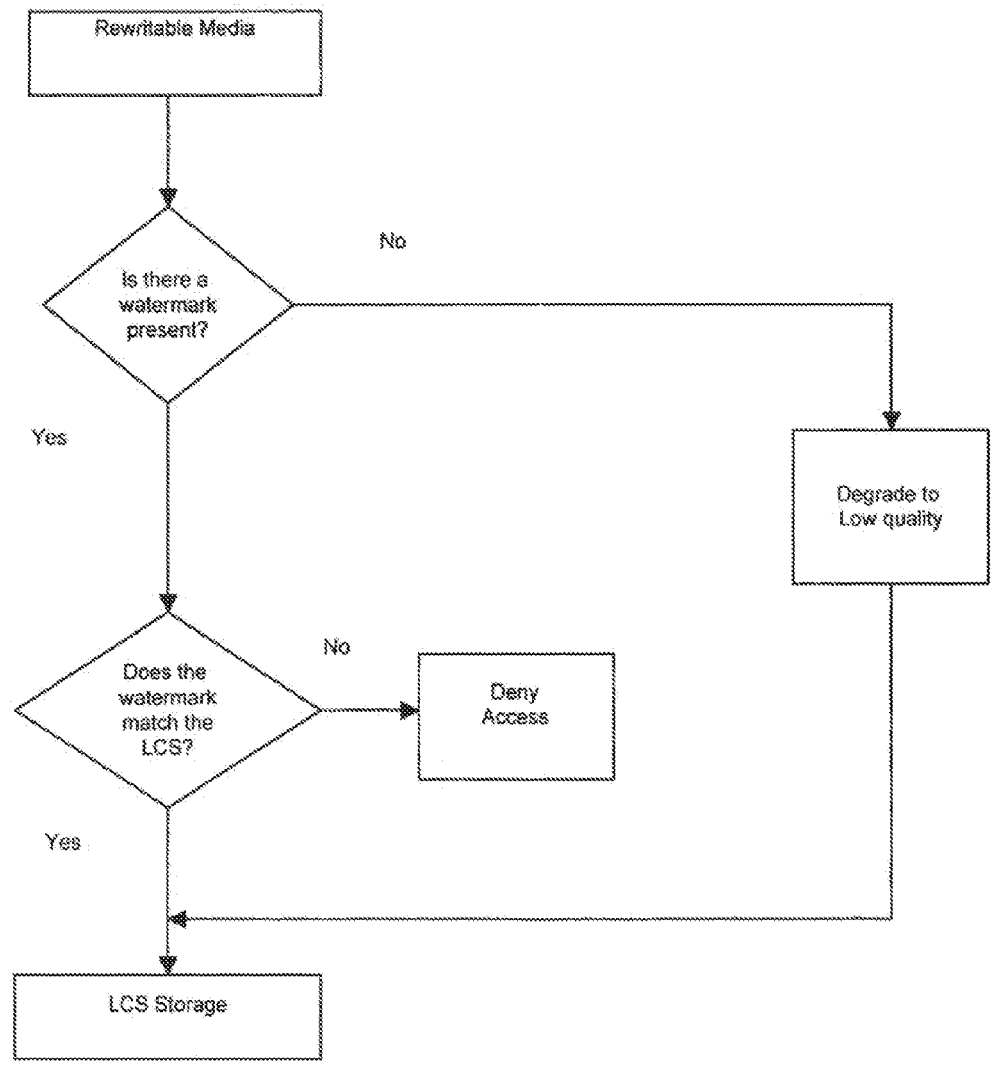
FIG. 2 is flow diagram illustrating the functions performed by the LCS of FIG. 1 when content enters the LCS Domain from the rewritable media.

In FIG. 2, content enters the LCS Domain from the rewritable media (such as a hard drive). This communication path is identified as Path 2 on FIG. 1. The LCS Domain analyzes the content to determine if a watermark is present in the content. If no watermark is present, then the quality of the content is downgraded to Low Quality before it is stored in the LCS Storage. If a watermark is present, then the watermark is extracted and compared with the watermark of the LCS in order to determine if a match exists. In the event of a match, the content is permitted to be stored on the LCS Storage at the same level of quality which the content entered the LCS Domain. Optionally, if a watermark is present, the hash may be checked as further verification; and if the hash matches, the content is allowed in at High Quality. If it does not match, the content is rejected. If the extracted watermark does not match the expected watermark, then the content is denied access to the LCS Storage (i.e., the content is rejected).

Figure 3:
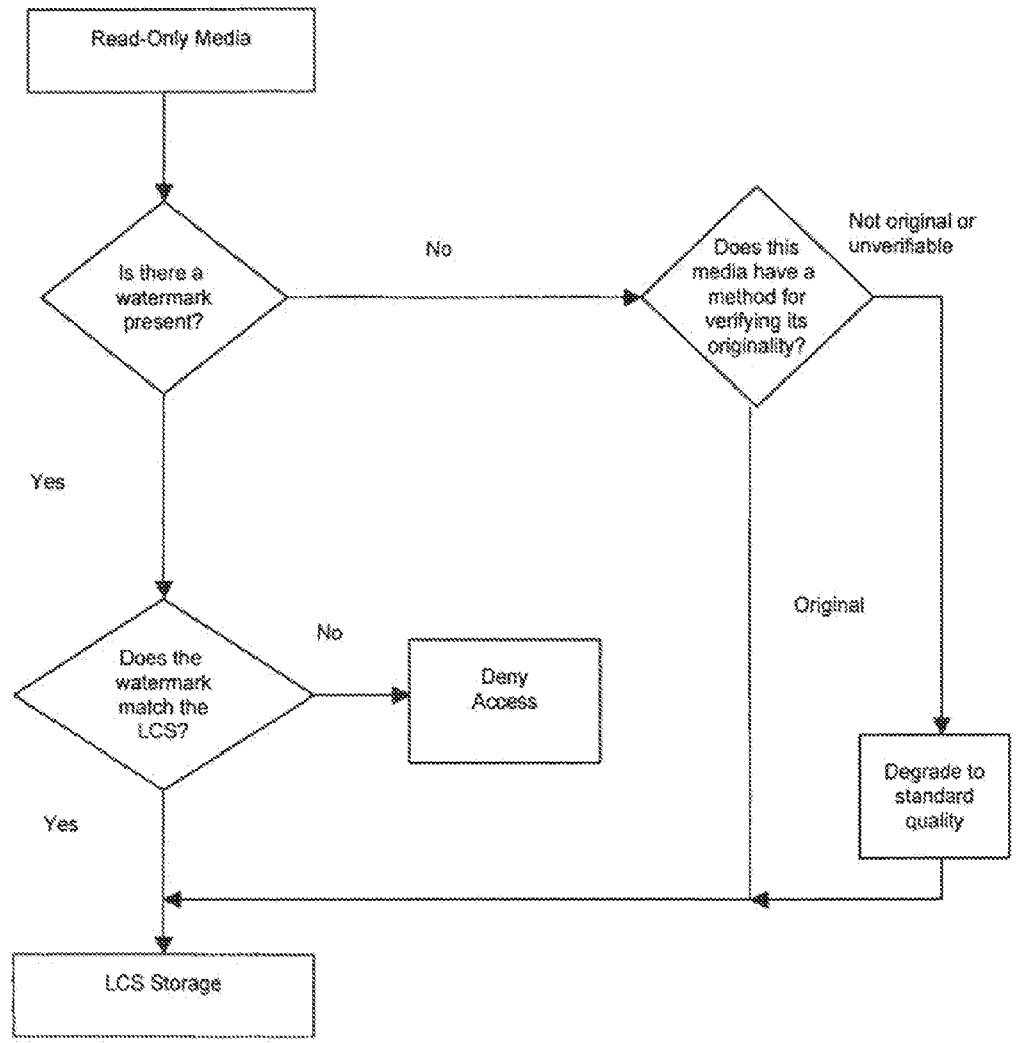
FIG. 3 is flow diagram illustrating the functions performed by the LCS of FIG. 1 when content enters the LCS Domain from the read-only media.

In FIG. 3, content enters the LCS Domain from the Read-Only media. This communication path is identified as Path 3 on FIG. 1. The LCS Domain analyzes the content to determine if a watermark is present in the content. If no watermark is present, then the LCS attempts to further analyze the content using other methods (i.e., other than watermarking) to try and verify the content for originality. If the content cannot be verified or is deemed to have been altered, then the content is downgraded to Standard Quality (or even Low Quality) before it is stored in the LCS Storage. If a watermark is present, then the watermark is extracted and compared with the watermark of the LCS in order to determine if a match exists. In the event of a match, or in the event that the content is verified by means other than the watermark, the content is permitted to be stored on the LCS Storage at the same level of quality which the content entered the LCS Domain (which is likely to be High Quality). For example, the Read-Only media may also contain a media-based identifier which verifies the content as an original, as opposed to a copy—and hence, a non-watermark method may be used to verify authenticity.

Optionally, even in the event of a watermark match, a hash may be checked as further verification; and if the hash matches, the content is allowed in at High Quality, but if there is no match, the content is rejected. If the extracted watermark does not match the expected watermark, or if the LCS is unable to identify any other method for verifying the content's authenticity, then the content may be denied access to the LCS Storage (i.e., the content may be rejected), or if preferred by the user, the content may be permitted into the system at a degraded quality level. It is the user's prerogative to decide how the system will treat non-authenticated content, as well as legacy content.

Figure 4:
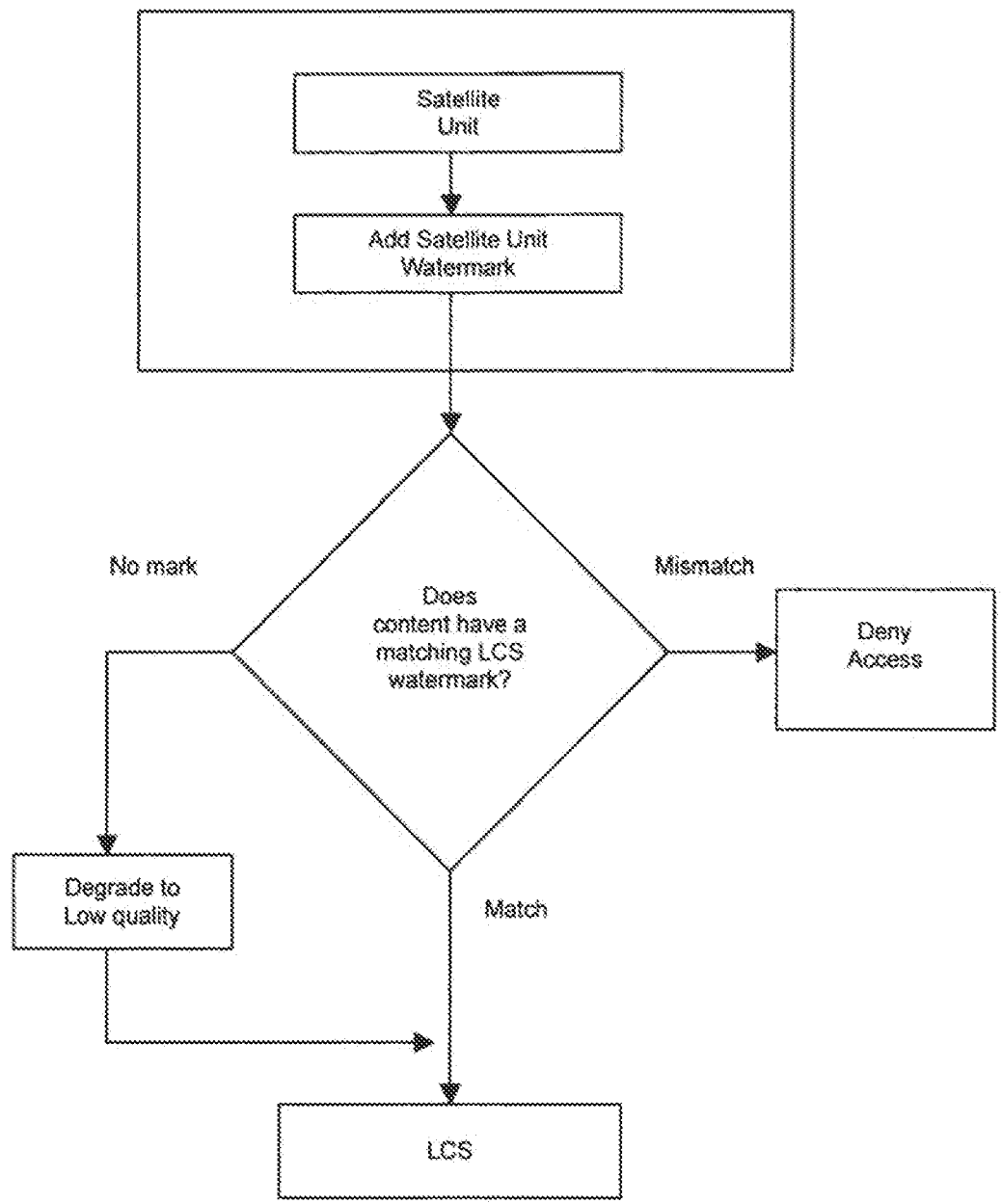
FIG. 4 is flow diagram illustrating the functions performed by the LCS of FIG. 1 when content enters the LCS Domain from the satellite unit.

In FIG. 4, content enters the LCS Domain from the satellite unit. This communication path is identified as Path 4 on FIG. 1. Content from an SU is marked with an SU watermark before exiting the SU. The LCS analyzes the content from the SU for watermarks, and in particular to determine if there is a watermark that matches that of the LCS. If the watermarks match, the content is permitted access to the LCS at the highest quality level. If there is a mismatch, then the content is denied access (i.e., the content is rejected). If the content does not contain a watermark, the quality is downgraded to Low Quality before permitting access to the LCS. Optionally, even in the event of a watermark match, a hash may be checked as further verification; and access at the highest quality level may depend upon both a match in watermarks and a match in hashes.

Figure 5:
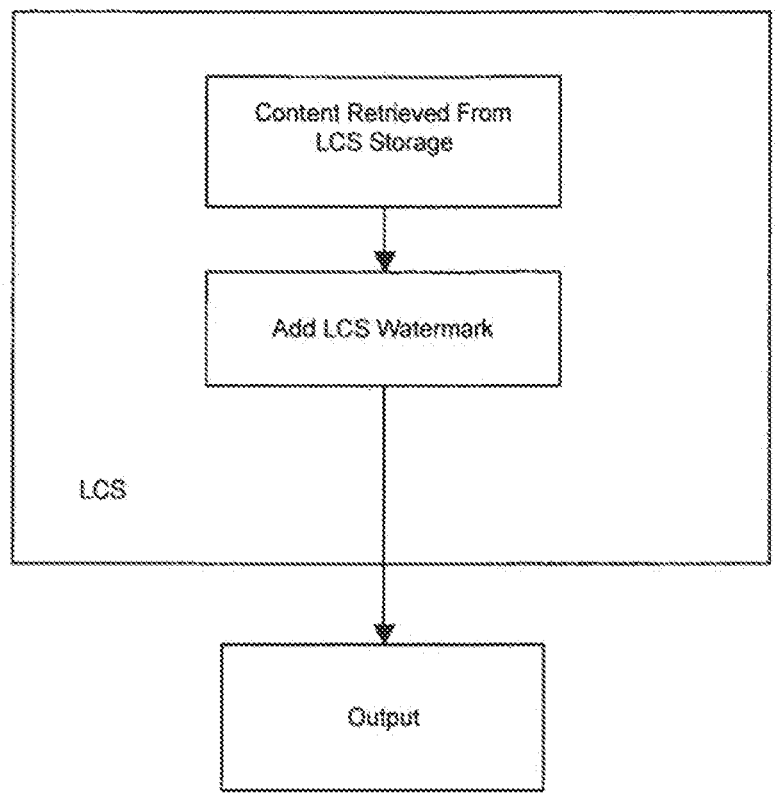
FIG. 5 is flow diagram illustrating the functions performed by the LCS of FIG. 1 when content leaves the LCS Domain.

In FIG. 5, content is shown leaving the LCS Domain. This communication path is identified as Path 5 on FIG. 1. Content is retrieved from the LCS storage and then the content may be watermarked with a watermark that is unique to the LCS (for example, one that is based upon the LCS's Unique ID). Optionally, a hash may be attached to the watermarked content, and/or the hash may be embedded as part of the watermark. If an external hash is used, preferably, for security purposes, the external hash should be created in a different manner from the embedded, watermark hash. Optionally, other information may be included in the watermark, for example, information to specify a time stamp, the number of allowable copies, etc. After watermarking, the content may be permitted to exit the LCS Domain, and may be exported to a device outside the LCS Domain, including for example, a rewritable media, a viewer, player, or other receiver.

Figure 6:
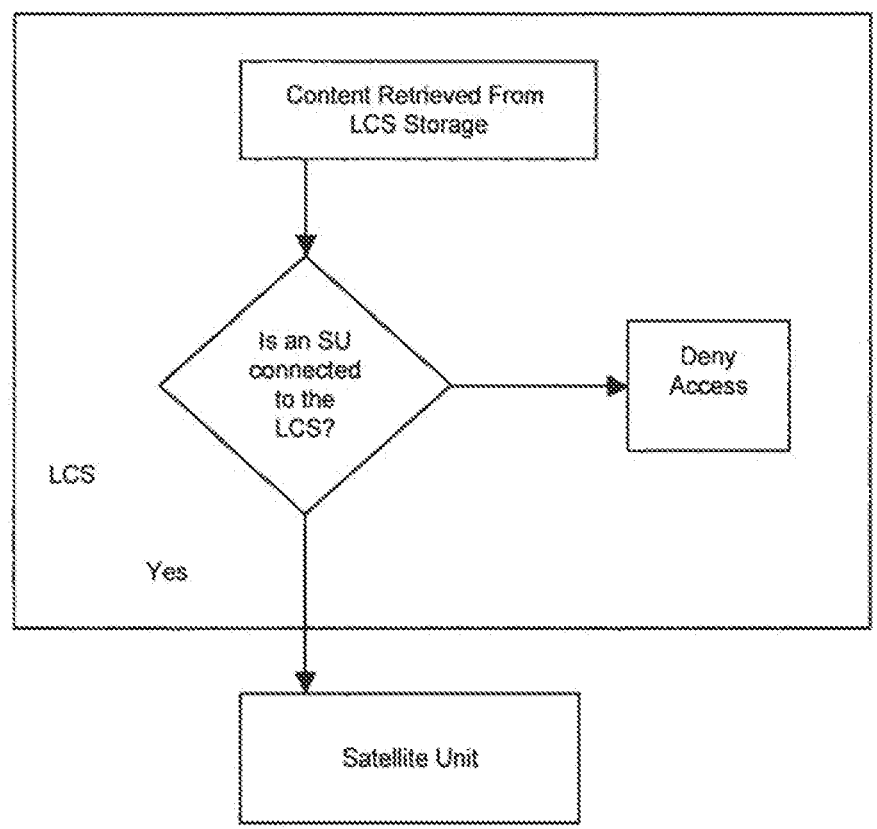
FIG. 6 is flow diagram illustrating the functions performed by the LCS of FIG. 1 when content leaves the LCS Domain from the read-only media.

In FIG. 6, content is shown leaving the LCS Domain. This communication path is identified as Path 6 on FIG. 1. This path is similar to Path 5, with a few important differences. The output receiver is an SU, and because the receiver is an SU, the content may leave the LCS without being watermarked. Path 6 requires a secure protocol to determine that the receiver is in fact an SU. Once the path is verified, the content can be exported without a watermark. The LCS may optionally transmit the content together with a hash value which will be uniquely associated with the content.

Figure 7:
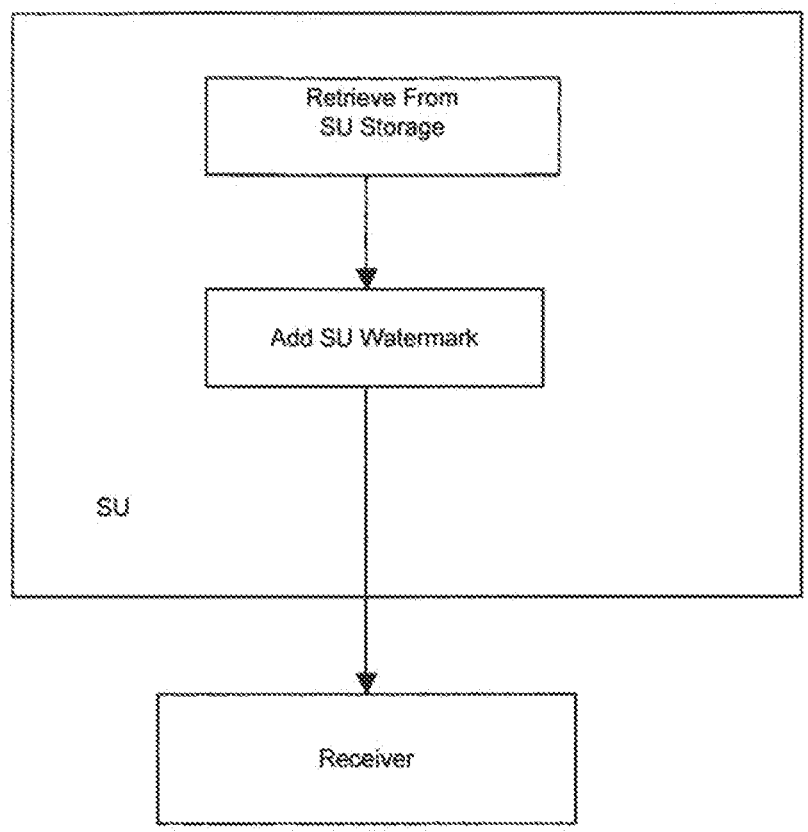
FIG. 7 is flow diagram illustrating the functions performed by the LCS of FIG. 1 when content leaves the SU to a receiver other than the LCS.
Figure 8:
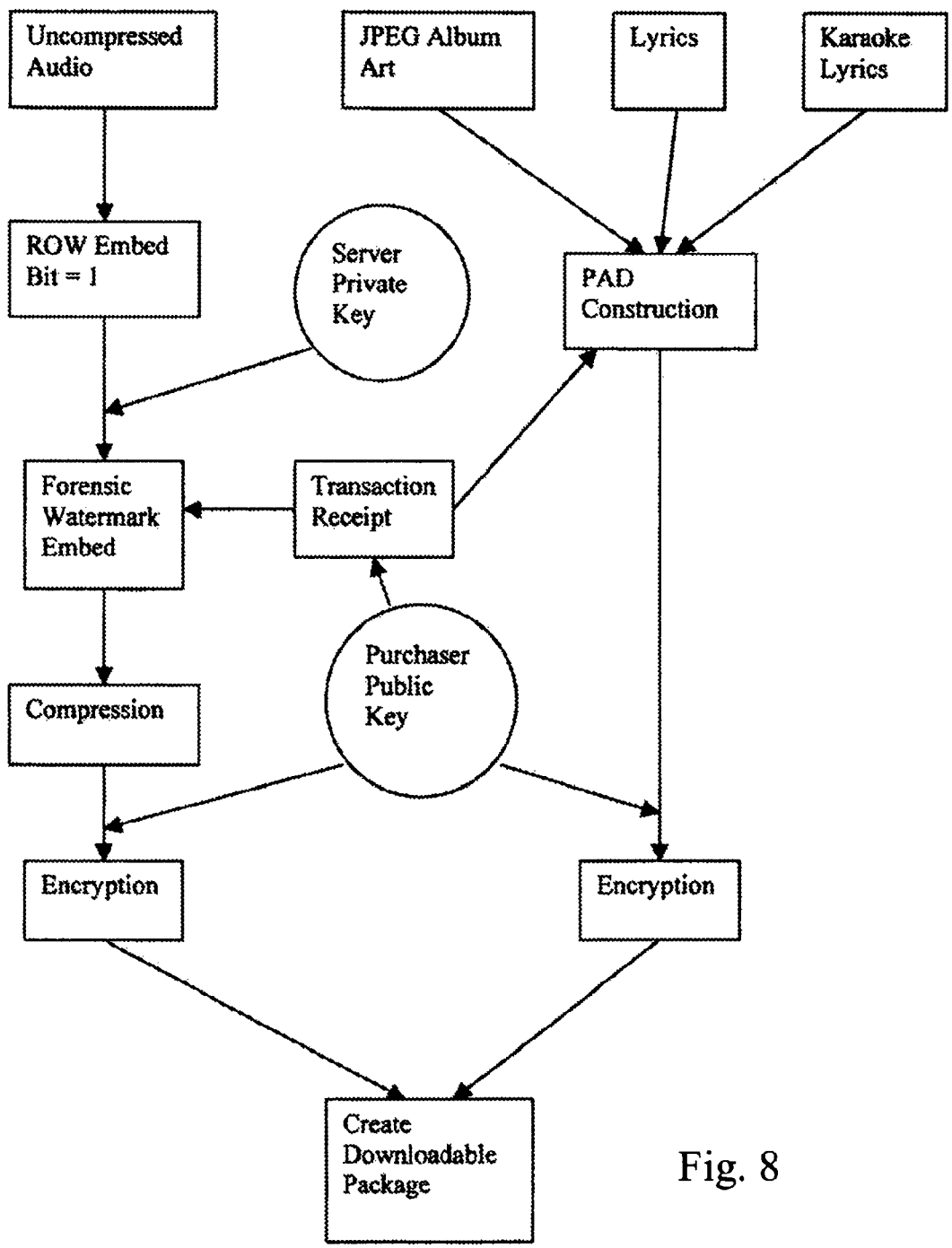
FIG. 8 is a sample embodiment for an SPCS Audio Server, and in particular shows how secured content packages are created as downloadable units. "PAD" refers to "Protected Associated Data".
Figure 9:
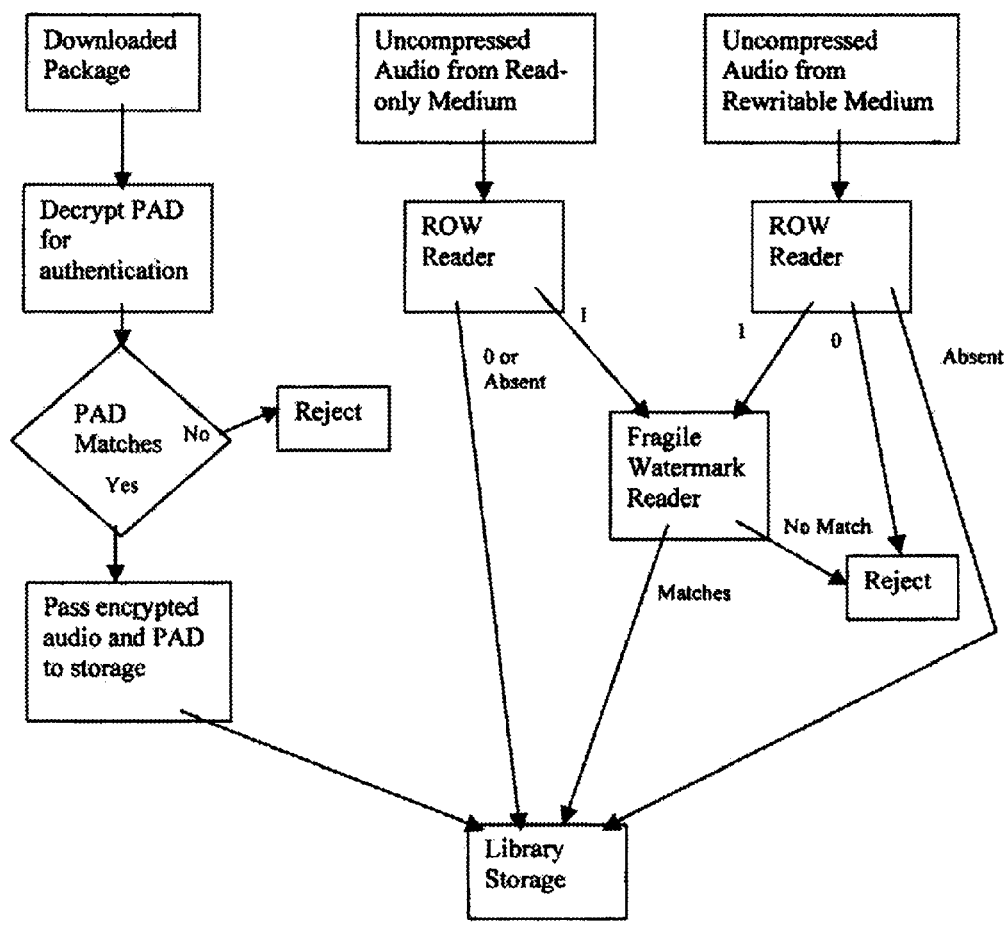
FIG. 9 is a sample embodiment for an SPCS Audio Server, and in particular shows how the LCS works on the input side for an SPCS Audio Server. "PAD" refers to "Protected Associated Data".
Figure 10:
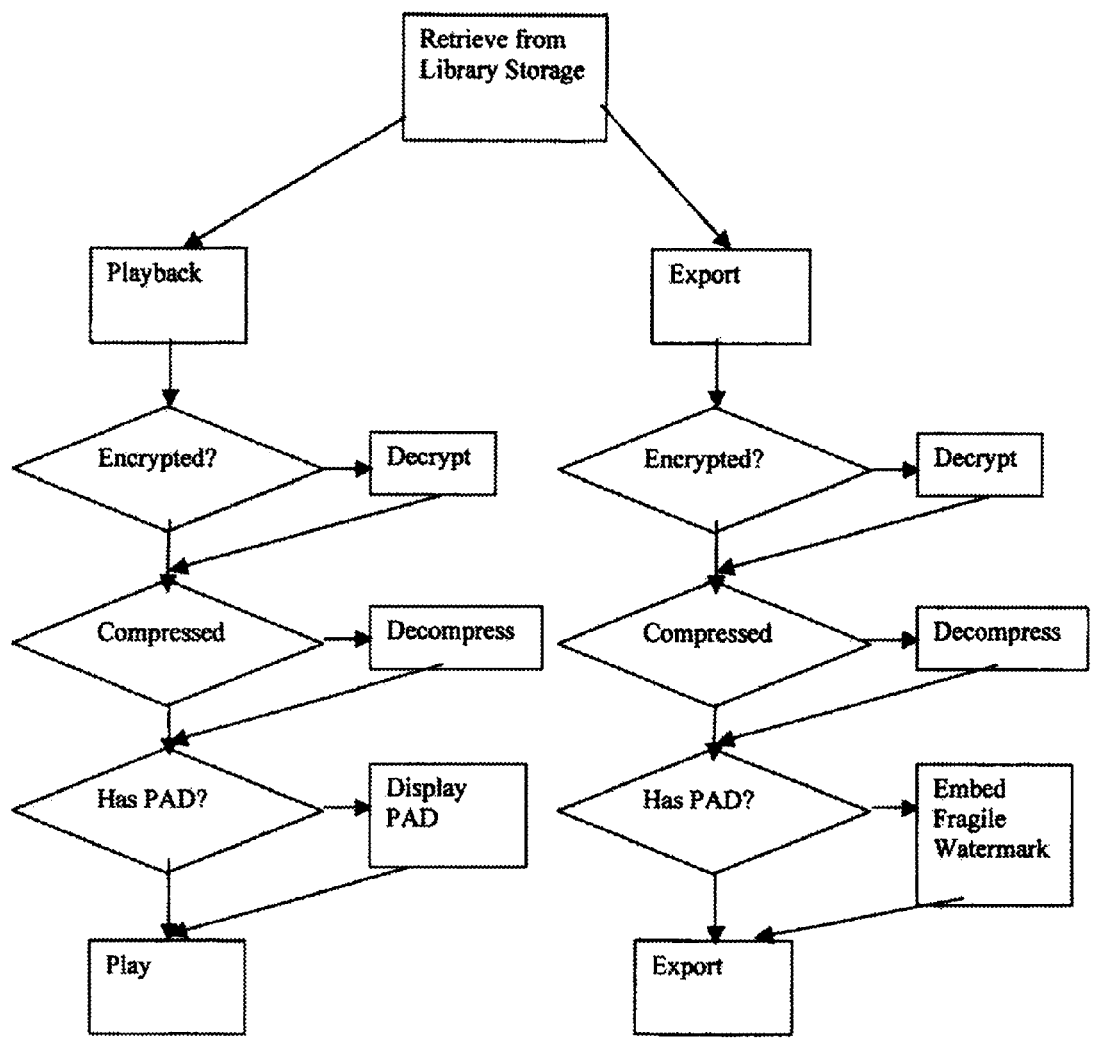
FIG. 10 is a sample embodiment for an SPCS Audio Server, and in particular shows how the LCS works on the output side. "PAD" refers to "Protected Associated Data".

In FIG. 7, content is shown leaving the SU, to a receiver other than the LCS. This communication path is identified as Path 7 on FIG. 1. Content is retrieved from the SU storage and then the content may be watermarked with a watermark that is unique to the SU (for example, one that is based upon the SU's Unique ID). Optionally, a hash may be attached to the watermarked content, and/or the hash may be embedded as part of the watermark. If an external hash is used, preferably, for security purposes, the external hash should be created in a different manner from the embedded, watermark hash. Optionally, other information may be included in the watermark, for example, information to specify a time stamp, the number of allowable copies, etc., and may even include the hash which the LCS attached to the content After watermarking, the content may be permitted to exit the SU, and may be exported to a device other than the LCS, including for example, a rewritable media, a viewer, player, or other receiver. The quality level of the content leaving the LCS is generally the same quality level as that of the content when stored internally to the LCS.

The system of the present invention is utilized to complete digital data transactions. A typical transaction would have the following steps:

1.) Using an LCS, a user connects to a SECD.

2.) The user reviews a collection of data sets which are available for license (which for purposes of this application, may be equated with a purchase). The user then selects a data set a song or other content), and purchases (or otherwise obtains the right to receive) a copy of the data set. (The user may transmit purchase information, for example, credit card information, using digital security that is known in the art of electronic commerce.)

3.) The SECD transmits the secured content to the LCS. Before transmitting any digital content, the SECD embeds at least one watermark and may also transmit (perhaps through cryptography) at least one hash value along with the data, being transmitted. The at least one hash value may be embedded with the at least one watermark or may be attached to the beginning or end of the data being transmitted. Alternately, the hash output may be combined in ways that are known in the art.

4.) The LCS optionally may send its public key to the SECD, in which case the SECD may use the LCS public key to apply an additional security measure to the data to be transmitted, before the data is actually transmitted to the LCS.

5.) The LCS receives the secured content transmitted by the SECD. The LCS may optionally use its private key to remove the additional layer of security which was applied with the LCS's public key.

6.) The LCS may authenticate the secure content that was received from the SECD by checking the watermark(s) and/or hash values. Optionally, the LCS may unpack the secured content from its security wrapper and/or remove any other layers of security. If the content can be authenticated, the content may be accepted into the LCS domain. Otherwise, it may be rejected.

Fragile Watermark Structure

A fragile watermark—one that is encoded in the of each 16 bit sample—can actually hold all of the data that would typically comprise the information being transmitted in the SecureChannel™. At a typical sampling rate of 44.1 kHz, there is 88,200 16 bit samples for each second of data in the time domain (44,100.times.2 stereo channels). This provides 88,200 bits per second which may be used for storing a fragile watermark. A typical 3 minute stereo song could therefore accommodate 1.89 MB of data for a fragile watermark. (The watermark is called fragile, because it is easily removed without greatly sacrificing the quality of the audio data.) 1.89 MB represents an immense capacity relative to the expected size of the typical data to be transmitted in a SecureChannel (100-200 K).

Preferably, the fragile watermark is bound to a specific copy of a specific song, so that "information pirates" (i.e., would-be thieves) cannot detect a watermark and then copy it onto another song in an effort to feign authorization when none exists. A fragile watermark may also contain information which can be utilized by various receivers which might receive the signal being packaged. For instance, a fragile watermark may contain information to optimize the playback of a particular song on a particular machine. A particular example could include data which differentiates an MP3 encoded version of a song and an AAC encoded version of the same song.

One way to bind a fragile watermark to a specific data set is through the use of hash functions. An example is demonstrated by the following sequence of steps:

1.) A digital data set (e.g., a song) is created by known means sampling music at 44.1 kHz, to create a plurality of 16 bit data sets). The digital data set comprises a plurality of sample sets (e.g., a plurality of 16 bit data sets).

2.) Information relative to the digital data set (e.g., information about the version of the song is transformed into digital data (which we will call the SecureChannel data), and the SecureChannel data is then divided into a plurality of SecureChannel data blocks, each of which blocks may then be separately encoded.

3.) A first block of the SecureChannel data is then is encoded into a first block of sample sets (the first block of sample sets comprising—at a minimum—a sufficient number of sample sets to accommodate the size of the first Hock of Secure Channel Data), for example by overwriting the LSB of each sample in the first block of sample sets.

4.) A hash pool is created comprising the first block of encoded sample sets.

5.) A first hash value is then created using i) the hash pool, ii) a random (or pseudorandom) number seeded using a code that serves to identify the owner of the digital data set, and iii) the SecureChannel data;

6.) The first hash value is then encoded into a second block of sample sets, the second block of sample sets being sufficient in size to accommodate the size of the first hash value.

7.) The second block of sample sets is then added to the hash pool

8.) A second block of the SecureChannel data is then is encoded into a third block of sample sets.

9.) The third block of encoded sample sets is added to the hash pool.

10.) A second hash value is then created using i) the hash pool, ii) a random (or pseudorandom) number seeded using a code that serves to identify the owner of the digital data set, and iii) the SecureChannel data;

11.) The second hash value is then encoded into a fourth block of sample sets.

Steps 7-11 are then repeated for successive blocks of SecureChannel data until all of the SecureChannel data is encoded. Understand that for each block of SecureChannel data, two blocks of content data are utilized. Moreover, for efficiency, one could use a predetermined subset of the samples in the hash pool, instead of the whole block.

Each SecureChannel block may, for example, have the following structure:

```
{
    long BlockIdentifier;    //A code for the type of block
    long BlockLength;        //The length of the block
    ...                      //Block data of a length matching
                             BlockLength
    char IdentityHash[hashSize];
    char InsertionHash[hashSize];
}
```

In theory, each SecureChannel block may be of a different type of block (i.e., may begin with a different BlockIdentifier). In operation, a software application (or even an ASIC) may read the BlockIdentifier and determine whether it is a recognized block type for the particular application. If the application does not recognize the block type, the application may use the BlockLength to skip this block of SecureChannel.

Certain block types will be required to be present if the SecureChannel is going to be accepted. These might include an identity block and a SecureChannel hash block. The SecureChannel data may or may not be encrypted, depending on whether the data is transfer-restricted (a type of value-adding component, that is, VAC) or simply informative. For instance, user-added SecureChannel data need not be encrypted. A BlockIdentifier may also be used to indicate whether a SecureChannel data block is encrypted or not.

Robust Open Watermark (ROW)

A Robust-Open Watermark may be used to divide content into three categories. (The term "open watermark" is used merely to indicate that the watermark relies on a secret which is shared by an entire class of devices, as opposed to a secure watermark—which is readable only by a single member of a class of devices.) A binary setting may be used, whereby one state (e.g., "1") may be used to identify secure protected content—such as content that is distributed in a secured manner. When the LCS detects a secured status (e.g., by determining that the ROW is "1"), the content must be accompanied by an authenticatable SecureChannel before the content is permitted to enter the LCS Domain (e.g., electronic music distribution or EMD content). The other binary state (e.g., "0") may be used to identify unsecured content, for example, non-legacy media that is distributed in a pre-packaged form (e.g. CD's). When the binary setting is "0", the content may or may not have a SecureChannel. Such "0 content" shall only be admitted from a read-only medium in its original file format (e.g., a 0 CD shall only be admitted if it is present on a Redbook CD medium). On the other hand, if the ROW is absent, then the LCS will understand that the content is "legacy". Legacy content may be admitted, or optionally, may be checked for a fragile watermark—and then admitted only if the fragile watermark is present. It would be possible to permit unfettered usage of legacy content—though again, it is the prerogative of the user who sets up the LCS.

Robust Forensic Watermark

Preferably, a robust forensic watermark is not accessible in any way to the consumer—or to "information pirates." A forensic watermark may be secured by a symmetric key held only by the seller. A transaction may be embedded at the time of purchase with a hash matching the symmetric key. The watermark is then embedded using a very low density insertion mask (<10%), making it very difficult to find without the symmetric key. Retrieval of such a watermark is not limited by real-time/low cost constraints. The recovery will typically only be attempted on known pirated material, or material which is suspected of piracy. A recovery time of 2 hours on a 400 MHz PC may, therefore, be reasonable.

Sample Embodiment

Renewability

The system of the present invention contemplates the need for updating and replacing previously-embedded watermarks (which may be thought of generally as "renewing" a watermark). If someone is able to obtain the algorithms used to embed a watermark—or is otherwise able to crack the security, it would be desirable to be able to embed a new watermark using a secure algorithm. New watermarks, however, cannot be implemented with complete success over night, and thus, there inevitably will be transition periods where older SPCS are operating without updated software. In such a transition period, the content must continue to be recognizable to both the old SPCSs and the upgraded SPCSs. A solution is to embed both the original and the upgraded watermarks into content during the transition periods. Preferably, it is the decision of the content owner to use both techniques or only the upgraded technique.

The operation of the system of the present invention is complicated, however, by the presence of "legacy" digital content which is already in the hands of consumer (that is, digital content that was commercially distributed before the advent of watermarking systems) because legacy content will continue to be present in the future. Moreover, pirates who distribute unauthorized content will also complicate matters because such unauthorized copies are likely to be distributed in the same formats as legacy content. As it is unlikely that such unwatermarked content can ever be completely removed, the present system must try to accommodate such content.

Hardware can be configured to read old ROW content and extract the old ROW and insert in the content a new ROW.

While the invention has been particularly shown and described by the foregoing detailed description, it will be understood by those skilled in the art that various other changes in form and detail may be made without departing from the spirit and scope of the invention.

The invention claimed is:

1. A local content server system (LCS), comprising:
   an LCS communications port;
   an LCS storage unit for storing digital data;
   an LCS domain processor that imposes a plurality of rules and procedures for content being transferred between said LCS and devices outside said LCS, thereby defining a first LCS domain; and
   a programmable address module which can be programmed with an LCS identification code uniquely associated with said LCS domain processor;
   wherein said LCS stores in said LCS storage unit said plurality of rules for processing a data set;
   wherein said LCS is configured to receive via said LCS communications port a first data set that includes data defining first content;
   wherein said LCS is configured to determine whether said first content belongs to a different LCS domain than said first LCS domain;
   wherein said LCS is configured to exclude from said first LCS domain said first content when said LCS determines that said first content belongs to said different LCS domain;

wherein said LCS is configured to use said LCS domain processor to determine, upon receipt by said LCS of said first data set via said LCS communications port, from inspection of said first data set, a first data set status value of said first data set to be at least one of unsecure, secure, and legacy;

wherein said LCS is configured to use said first data set status value to determine which of a set of rules to apply to process said first data set;

wherein said LCS is configured to determine, at least in part from rights associated with a user identification associated with a prompt received by said LCS for said first content, a quality level at which to transmit said first content, wherein said quality level is one of at least unsecure, secure, and legacy; and wherein said LCS is configured to transmit said first content at the determined quality level in response to said prompt.

2. The LCS of claim 1, wherein said LCS is configured to mark said first content with said LCS identification code.

3. The LCS of claim 1 wherein said LCS is configured to mark said first content with said LCS identification code and to transmit said first content at said determined quality level along with said mark.

4. The LCS of claim 3 wherein said LCS is configured to mark said first content with said LCS identification code and to transmit said first content at said determined quality level along with said mark, and wherein said mark is an imperceptible watermark.

5. The LCS of claim 1 configured to generate a mark based upon said LCS identification code.

6. The LCS of claim 5 wherein said LCS is configured to transmit said mark along with said first content when transmitting said first content.

7. The LCS of claim 1, wherein said LCS is configured to extract a watermark from said first data set.

8. The LCS of claim 1 further comprises an interface, and said LCS configured to communicate via said interface with a Satellite Unit (SU).

9. A combination of the LCS of claim 1 and a Satellite Unit (SU), wherein:
said LCS further comprises an interface, and said LCS is configured to communicate via said interface with said Satellite Unit;
wherein said SU is capable of receiving and transmitting digital content;
wherein said SU stores in non transitory form an SU identification code uniquely associated with said SU, said SU comprises structure for storing at least one of audio and visual content in non transitory form; and
wherein said SU comprises structure for playing said first content.

10. A portable player comprising the LCS of claim 1.

11. A portable player comprising the combination of claim 9.

12. The combination of claim 9 wherein said LCS is configured to determine if data received by said LCS from said SU contains said LCS identification code.

13. A method for using a local content server system (LCS), said LCS comprising an LCS communications port; an LCS storage unit for storing digital data in non-transitory form; an LCS domain processor that imposes a plurality of rules and procedures for content being transferred between said LCS and devices outside said LCS, thereby defining a first LCS domain; and a programmable address module programmed with an LCS identification code uniquely associated with said LCS domain processor; comprising:
storing, in said LCS storage unit, a plurality of rules for processing a data set;
receiving, via said LCS communications port, a first data set that includes data defining first content;
said LCS determining whether said first content belongs to a different LCS domain than said first LCS domain;
said LCS excluding from said first LCS domain said first content when said LCS determines that said first content belongs to said different LCS domain;
said LCS domain processor determining, from said first data set, a first data set status value of said first data set to be at least one of unsecure, secure, and legacy;
said LCS determining, using said first data set status value, which of a set of rules to apply to process said first data set; and
said LCS determining, at least in part from rights associated with an identification associated with a prompt received by said LCS for said first content, a quality level at which to transmit said first content, wherein said quality level is one of at least unsecure, secure, and legacy;
said LCS transmitting said first content at the determined quality level.

14. The method of claim 13, wherein said LCS is configured to mark said first content with said LCS identification code.

15. The method of claim 13, wherein said LCS is configured to mark said first content with said LCS identification code and to transmit said first content at said determined quality level along with said mark.

16. The method of claim 13, wherein said LCS is configured to mark said first content with said LCS identification code and to transmit said first content at said determined quality level along with said mark, and wherein said mark is an imperceptible watermark.

17. The method of claim 13, further comprising said LCS generating a mark based upon said LCS identification code.

18. The method of claim 17 further comprising said LCS transmitting said mark along with said first content when transmitting said first content.

19. The method of claim 13 further comprising said LCS extracting a watermark from said first data set.

20. The method of claim 13 wherein said LCS is contained in a portable player designed to play at least one of audio and video content.

21. The LCS of claim 1, wherein said LCS is configured to encrypt said first data set.

22. The LCS of claim 21 wherein said LCS is configured to store, in encrypted form, said first content in said LCS storage unit.

23. The method of claim 13 further comprising encrypting and storing in encrypted form, in said LCS storage unit, said first content.

* * * * *